US007299075B2

(12) United States Patent
Gottlieb et al.

(10) Patent No.: US 7,299,075 B2
(45) Date of Patent: Nov. 20, 2007

(54) WALKIE-TALKIE WITH SCREEN TO SHOW A LIST OF OTHER WALKIE-TALKIES WITHIN COMMUNICATION RANGE

(76) Inventors: Mark Gottlieb, 8625 Hampton Way, Fairfax Station, VA (US) 22039; Warren Bosch, 43451 Livery Sq., Ashburn, VA (US) 20140; Mark Lyons, 4064 Rock Run La., Goldvein, VA (US) 22720

( * ) Notice: Subject to any disclaimer, the term of this patent is extended or adjusted under 35 U.S.C. 154(b) by 296 days.

(21) Appl. No.: 10/776,201

(22) Filed: Feb. 12, 2004

(65) Prior Publication Data

US 2005/0181726 A1    Aug. 18, 2005

(51) Int. Cl.
*H04B 1/38* (2006.01)
(52) U.S. Cl. ............... 455/566; 455/41.2; 455/517; 455/518; 455/404.1
(58) Field of Classification Search ............. 455/518, 455/519, 90.2, 41.2, 404.1
See application file for complete search history.

(56) References Cited

U.S. PATENT DOCUMENTS

| 5,953,671 | A * | 9/1999 | Childress ............... 455/512 |
| 6,446,118 | B1 | 9/2002 | Gottlieb |
| 2002/0006804 | A1* | 1/2002 | Mukai et al. ........... 455/518 |
| 2002/0122410 | A1* | 9/2002 | Kulikov et ald. ....... 370/349 |
| 2002/0123310 | A1* | 9/2002 | Ikeda et al. ............ 455/70 |
| 2003/0100326 | A1* | 5/2003 | Grube et al. ........... 455/515 |
| 2004/0015553 | A1* | 1/2004 | Griffin et al. .......... 709/206 |
| 2004/0203363 | A1* | 10/2004 | Carlton et al. ......... 455/41.2 |
| 2005/0107037 | A1* | 5/2005 | Delmulle et al. ....... 455/41.2 |
| 2005/0143135 | A1* | 6/2005 | Brems et al. ........... 455/564 |
| 2005/0239485 | A1* | 10/2005 | Kundu et al. ........... 455/519 |

OTHER PUBLICATIONS

"2004 Summary of what happend to Cybiko for new users.", Planet Cybiko>General>News, found at forums.planetcybiko.net/index.php? s=b3f7edc15eef4e532c49a . . . , 3 pages.
"Cybiko Xtreme Specifications", Cybiko Extreme, found at www.cybikoxtreme.com/support/specs.asp printed on Oct. 10, 2003, 3 pages.
"Cybiko Xtreme Wireless Inter-Tainment Computer On-line Guide", Version 1.5.07, 47 pages (published prior to Applicant's filing date).

(Continued)

*Primary Examiner*—Lester G. Kincaid
*Assistant Examiner*—Dung Lam
(74) *Attorney, Agent, or Firm*—Davidson Berquist Jackson & Gowdey LLP

(57) ABSTRACT

A device, method, and computer program product for identifying and communicating with digital communication devices within a communication range that includes a transmitter configured to transmit a control signal and a voice signal, a receiver configured to receive the control signal and the voice signal, a user interface unit having a display area, and a computational unit configured to control the transmitter to periodically transmit identifying information as the control signal. The control signal is received as remote identifying information by the other digital communication devices within the communication range. The remote identifying information is displayed on the display area of each of the digital communication devices receiving the control signal.

46 Claims, 17 Drawing Sheets

OTHER PUBLICATIONS

"Cybiko Xtreme Wireless Inter-Tainment Computer Quick Start Guide", Cybiko Inc., c2001, 10 pages.

"Cybiko" including schematics, DBZoo, found at www.dbzoo.com/wiki/cybiko/extremehardware, allegedly last modified Nov. 3, 2005, 3 pages.

"Cybiko", Deafgamers, found at www.deafgamers.com/cybiko.htm, 4 pages.

"Cybiko", Wikipedia, found at en.wikipedia.org/wiki/Cybiko, allegedly last modified Jul. 31, 2006, 3 pages.

"Planet Cybiko", found at planetcybiko.net/forums/index.php?act=home, 3 pages.

Désiré Athow, "CybikoXtreme, the £9.99 Wonder PDA", The Inquirer, Dec. 3, 2004, found at www.theinquirer.net/default.aspx?article=20018, 5 pages.

Rebecca Day, "Walkie-Talkie Coast to Coast", Popular Mechanics, Oct. 2003, 4 pages.

* cited by examiner

WALKIE-TALKIE WITH SCREEN TO SHOW A LIST OF OTHER WALKIE-TALKIES WITHIN COMMUNICATION RANGE

BACKGROUND OF THE INVENTION

1. Field of the Invention

The present invention relates generally to a two-way digital communication device and more specifically to a digital communication and identification device, method, and computer program using two-way radio-based technology to communicate with other digital communication devices and to show a list of other known digital communication devices that are available for communication.

2. Discussion of the Background

Two-way radios have become popular communication tools where land-based telephone or other communication methods are not well-suited. These two-way radios generally allow users to communicate with each other over known radio frequencies within the radio range of the two-way radios. Early two-way radios systems relied on the voice of the user of the two-way radio to alert another two-way radio user. As improvements were made to these systems, other call notification methods became available such as providing an audible tone to a particular two-way radio user. In many instances, these notification methods are ineffective because the sender of the call notification does not receive notification of whether the recipient is within the communication range of the two-way radio.

Thus, there exists an unmet need in the art for a two-way radio that notifies the user when another two-way radio is within or outside the radio range of the two-way radio.

SUMMARY OF THE INVENTION

One object of the present invention is to provide a digital communication device for identifying and communicating with other digital communication devices within a communication range, the communication device including a transmitter configured to transmit a control signal and a voice signal, a receiver configured to receive the control signal and the voice signal, a user interface unit having a display area, and a computational unit configured to control the transmitter to periodically transmit identifying information as the control signal. The control signal is received as remote identifying information by the other digital communication devices within the communication range. Information corresponding to at least a portion of the remote identifying information is displayed on the display area of each of the digital communication devices receiving the control signal. For example, while the control information may include a serial number and a name, only a portion of the name may be displayed or only a locally stored nickname corresponding to the serial number may be displayed.

Another object of the present invention is to provide a method for identifying and communicating with digital communication devices within a communication range that includes transmitting identifying information as a control signal periodically, receiving the control signal as remote identifying information corresponding to the digital communication devices within the communication range; displaying information corresponding to at least a portion of the remote identifying information on a display area corresponding to the digital communication devices within the communication range, capturing a voice communication via a voice input device (e.g., a microphone) and transmitting the voice communication as a voice signal upon selection of a transmit button by a user; and receiving the voice signal and outputting the voice communication on a speaker upon reception.

Yet another object of the present invention is to provide a computer program for identifying and communicating with digital communication devices within a communication range that includes a first computer code for transmitting identifying information as a control signal periodically, a second computer code for receiving the control signal as remote identifying information corresponding to the digital communication devices within the communication range, a third computer code for displaying information corresponding to at least a portion of the remote identifying information on a display area corresponding to the digital communication devices within the communication range, a fourth computer code for capturing a voice communication via a voice input device (e.g., a microphone) and transmitting the voice communication as a voice signal upon selection of a transmit button by a user, and a fifth computer code for receiving the voice signal and outputting the voice communication on a speaker upon reception.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
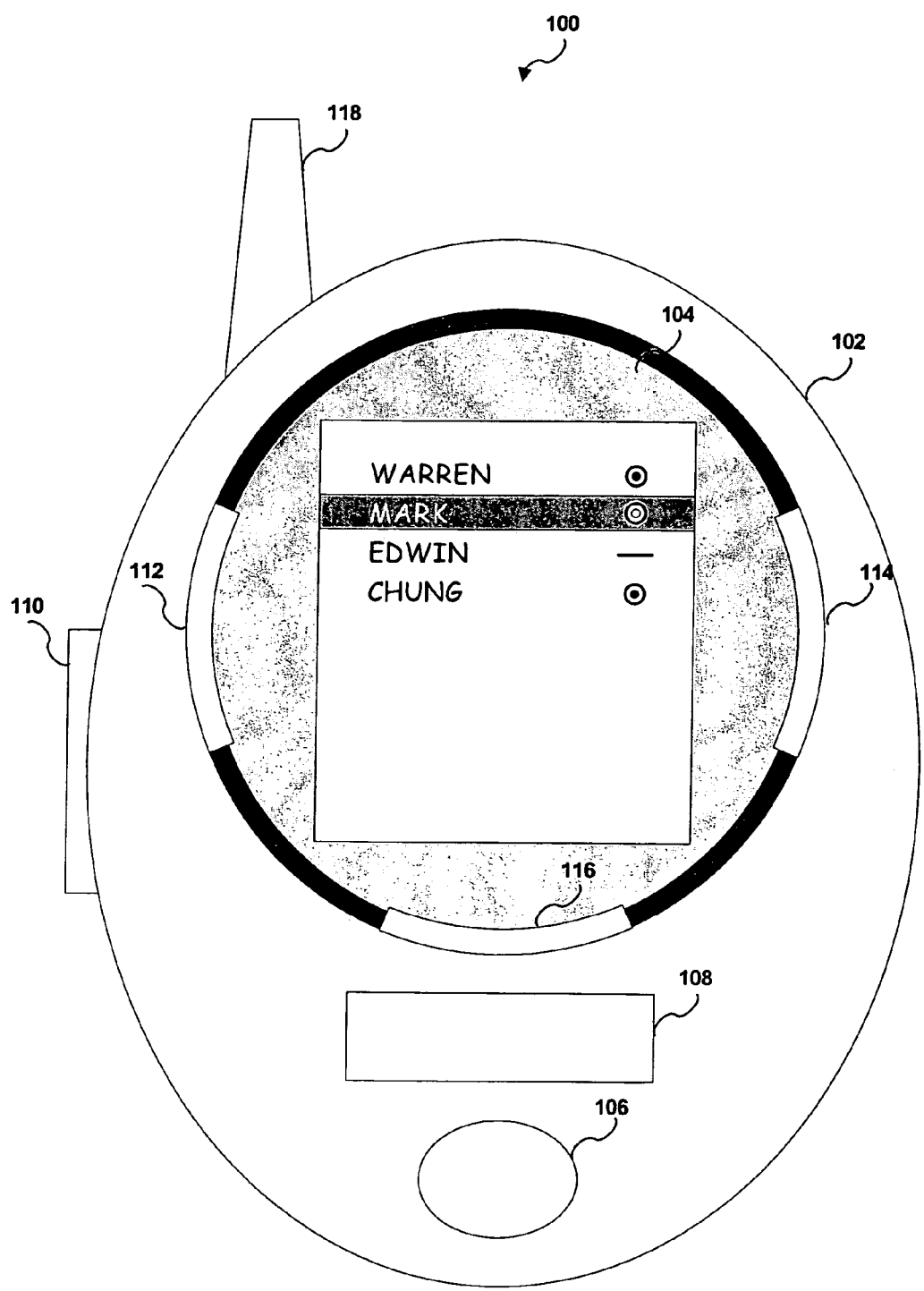
FIG. 1A is an example of the digital communication device according to an embodiment of the present invention.

Referring now to the drawings, wherein like reference numerals designate identical or corresponding parts throughout the several views, FIG. 1A is an example of a digital communication device according to an embodiment of the present invention. In this embodiment, the digital communication device 100 includes an enclosure 102 having an antenna 118, a user interface 104, a microphone 106, a speaker (not shown), and several controls (108, 110, 112, 114 and 116). The digital communication device 100 performs normal walkie-talkie operations using a digital radio signal in addition to identifying other communication devices within a communication range. For instance, antenna 118 is used to receive a digital radio signal that is output on a speaker. Also, transmit button 110 may be configured as a push-to-talk such that the voice of a user is received by a voice input device (e.g., a microphone) 106 and transmitted, using antenna 118, as a digital radio signal while transmit button 110 is selected. Further, digital communication device 100 may operate in a free-for-all mode, an emergency mode, or a normal mode. In the free-for-all and emergency modes, the voice communication is transmitted as a digital radio signal, and received and output on all digital communication devices with a communication range. Digital communication device 100 may also configured to transmit a distress call signal to one or more digital communication devices within a communication range using a distress button (not shown).

Additionally, multi-purpose button 108 may be configured as a wheel to scroll the user interface 104 or to select one or more user interface 104 entries. For instance, multi-purpose button 108 may be configured to perform different operations for scrolling, single-clicking, double-clicking and triple-clicking the multi-purpose button 108. Control buttons (112, 114 and 116) provide additional operational functionality. For instance, multi-purpose and control buttons (108, 112, 114 and 116) may be configured as, but not limited to, a transmit button, a record button, a play button, a free-for-all mode button, an emergency mode button, a distress call button, a non-verbal text mode button, a normal mode button, a store button, a block button, an unblock button, a group button, an ungroup button, a status button, a menu button, an exit button, a volume button, and a power button. Additionally, menus are provided to provide these and other operational functionality including configuring configuration parameters. Because the digital communication device 100 is a wireless receiver, such device may also be configured wirelessly by using, for example, a transmitter connected to or integrated with a PDA or computer. It is to be understood that FIG. 1A illustrates just one of the many possible embodiments of the digital communication device and that numerous variations are possible without departing from the scope of the present invention.

Figure 1B:
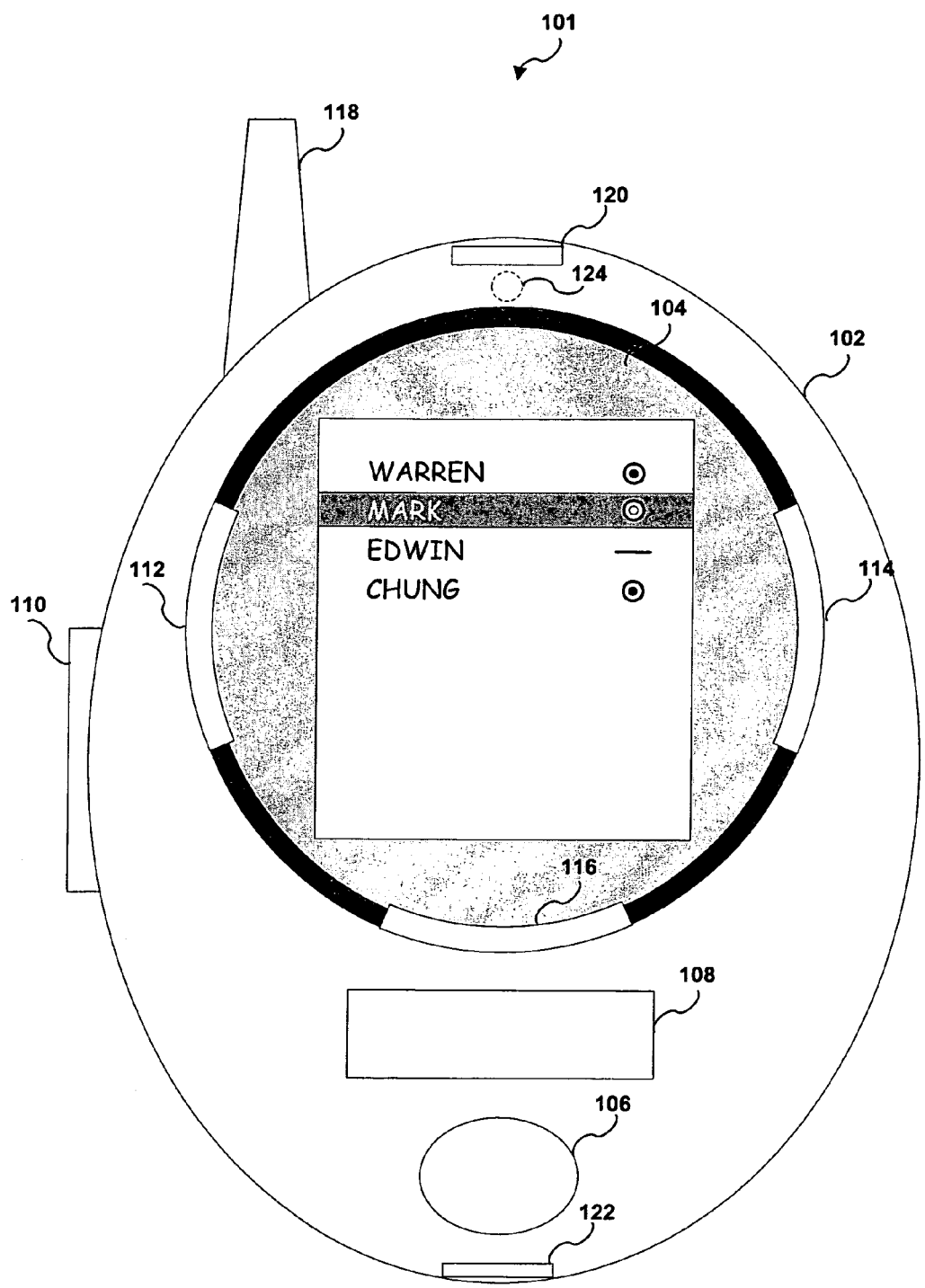
FIG. 1B is an example of the digital communication device according to an alternate embodiment of the present invention.

Referring to FIG. 1B, an example of the digital communication device according to an alternate embodiment of the present invention is shown. In this embodiment, the digital communication device 101 includes, in addition to all of the elements shown in FIG. 1A, a multi-purpose interface 122, a removable memory interface 120 and a camera 124. Multi-purpose interface 122 may be configured as, but not limited to, a computer interface and a keyboard interface. Removable memory interface 120 is configured to a receive a removable memory device. The camera 124 may be configured with any standard digital camera. Additionally, user interface 104 may optionally be configured as a touch screen user interface.

Figure 1C:
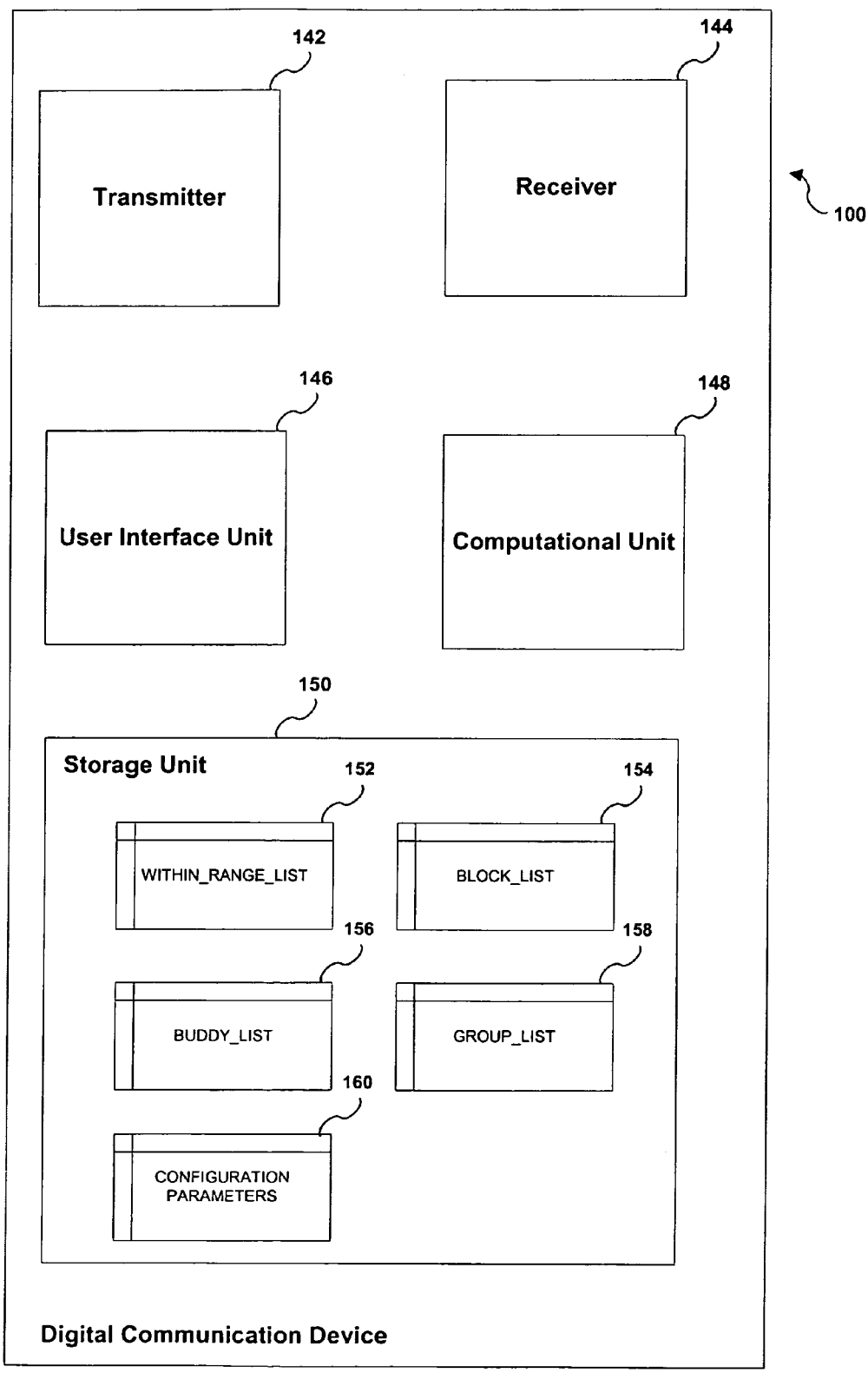
FIG. 1C is a block diagram of an exemplary digital communication device according to an embodiment of the present invention.

Referring to FIG. 1C, a block diagram of the digital communication device according to an embodiment of the present invention is shown. The digital communication device 100 includes five major sub units (142, 144, 146, 148 and 150). Transmitter 142 is configured to transmit a digital radio control signal and a voice signal. The digital radio control signal and the voice signal may either be transmitted collectively as a single digital radio transmission or separately as multiple digital radio transmissions. Transmitter 142 may optionally be configured to transmit a digital radio non-verbal text signal. Receiver 144 is configured to receive the digital radio control and voice signals. Receiver 144 may optionally be configured to receive a digital radio non-verbal text signal. The digital communication device utilizes, but is not limited to, a 900 MHz digital radio frequency using spread spectrum (or other frequency hopping) technology to transmit and receive digital radio signals within a communication range of approximately 1 mile. The digital communication device may utilize other protocols including, but not limited to, Blue tooth, Wi-Fi, Code Division Multiple Access (CDMA), Time Division Multiple Access (TDMA), Frequency Division Multiple Access (FDMA), Global System for Mobile communication (GSM), and the like. Computational unit 148 includes a CPU which may be implemented as any type of processor including commercially available microprocessors from companies such as Intel, AMD, Motorola, Hitachi, NEC, and Microchip.

The transmitter 142 performs communication with other digital communication devices using a "private, non-commercial network." As used hereinafter, a "private, non-commercial network" is defined as a network where (1) the transmitter 142 is dedicated to home or office use and (2) a periodic fee is not paid to a commercial institution for the right to send messages. (The term, however, does not exclude paying a governmental fee for the right to transmit a message, if required.) In a preferred embodiment of the private, non-commercial network, the transmitter 142 transmits directly to other digital communication devices without utilizing fixed towers to re-transmit the digital radio transmissions. In an alternate embodiment of the private, non-commercial network, the transmitter 142 transmits to any compatible device including fixed towers within a communication range of the digital communication device 100, as shown in FIG. 1F and described below.

The computational unit 148 is configured to control the transmitter 142 to periodically transmit unique identifying information as a control signal to other digital communication devices within a communication range of the digital communication device 100. For instance, as shown in FIG. 1E, several digital communication devices (100a-100d) are within the communication range 178 of digital communication device 100, while several other digital communication devices (100e-100g) are outside this communication range 178. The computation unit 148 for each of the digital communication devices (100-100g) is configured to periodically transmit identifying information as a control signal. In this case, a control signal transmitted by the digital communication devices (100a-100d) within the communication range 178 will be periodically received by digital communication device 100. Computation unit 148 is further configured to control the receiver 144 to receive these control signals and to control the user interface unit 146 to display the identifying information received. Identifying information includes at least a unique identifier that uniquely identifies each digital communication device and optionally includes a name or nickname. Status information corresponding to the current status of digital communication devices (100-100g) may optionally be included as a part of the identifying information or transmitted separately with a STATUS message as a control signal. The status of the digital communication devices (100-100g) may be set automatically by the digital communication devices (100-100g) as an indication of a hardware state, or may be set manually by the user. A user may select a status from a selectable list of built-in states of the user interface 146. The status may include, but is not limited to, "I'm Busy", "I'm Sleepy", "Do Not Disturb", "I'm Day Dreaming", and "Hardware Failure". Storage unit 150 may include, but is not limited to, any type of storage medium including floppy disks, optical disks, CD-ROMs, magneto-optical disks, ROMs, RAMs, EPROMs, EEPROMs, flash memory, magnetic or optical cards, or any other storage medium including a database. Storage unit 150 contains at least a WITHIN_RANGE_LIST 152 and configuration parameters 160. Storage unit 150 may optionally contain BLOCK_LIST 154, BUDDY_LIST 156 and GROUP_LIST 158. Again, it is to be understood that FIG. 1C illustrates just one of the many possible embodiments of the digital communication device and that numerous variations are possible without departing from the scope of the present invention. For instance, WITHIN_RANGE_LIST 152, configuration parameters 160, BLOCK_LIST 154, BUDDY_LIST 156 and GROUP_LIST 158 may optionally be stored as tables in a database contained in storage unit 150.

Figure 1D:
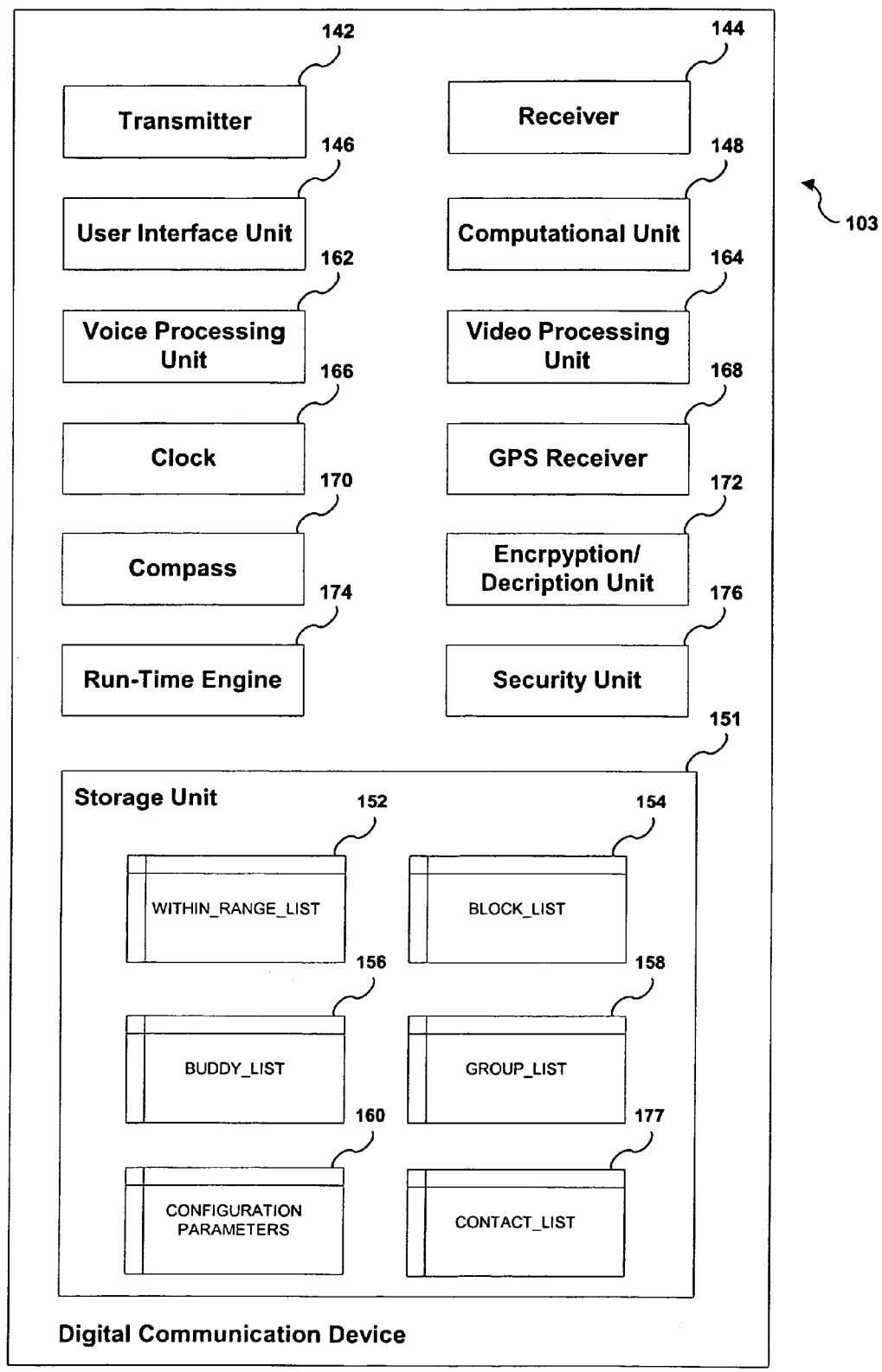
FIG. 1D is a block diagram of an exemplary digital communication device according to an alternate embodiment of the present invention.
Figure 1E:
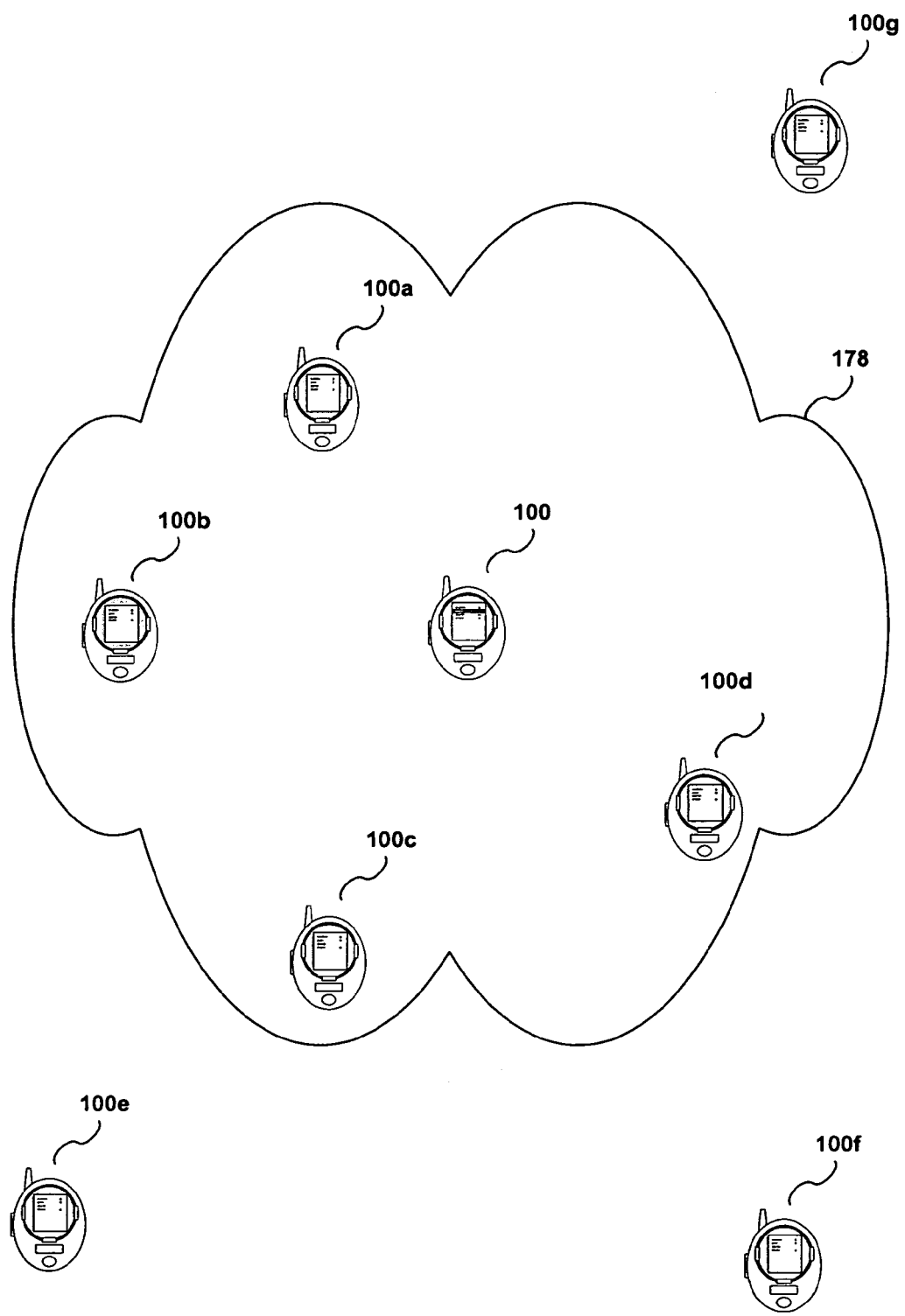
FIG. 1E is an example of several digital communication devices and illustrates a communication range according to an embodiment of the present invention.
Figure 1F:
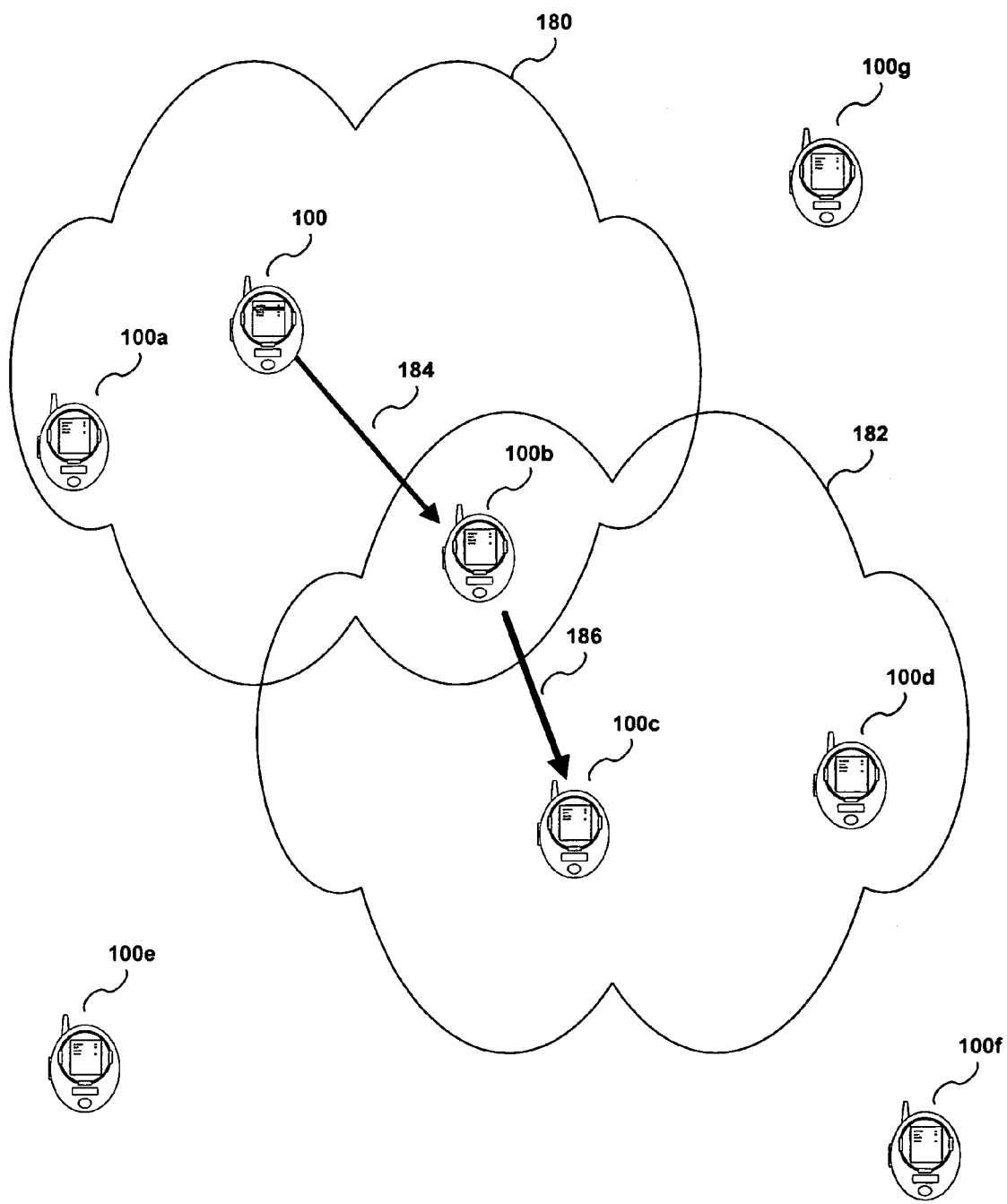
FIG. 1F is an example of several digital communication devices and illustrates a communication path across multiple communication devices to increase a communication range according to an alternate embodiment of the present invention.

Referring to FIG. 1D, a block diagram of the digital communication device according to an alternate embodiment of the present invention is shown. In this embodiment, the digital communication device 103 includes, in addition to all of the elements shown in FIG. 1C, eight additional units (162, 164, 166, 168, 170, 172, 174 and 176) and a CONTACT_LIST 177.

Voice processing unit 162 is configured to process voice communication captured via microphone 106. For instance, voice processing unit 162 may be configured for voice recognition, such that the digital communication device is operated using voice commands. Voice processing unit 162 may also be configured to digitally store voice communication using storage unit 150 as a voice recording to be either output on a speaker (not shown) or transmitted at some time in the future. Further, voice processing unit 162 may be configured to work in conjunction with encryption/decryption unit 172 to provide an encoded secure transmission between two or more digital communication devices (100a-100g). In this configuration, encryption/decryption unit 172 encrypts a communication before the transmission by transmitter 142 and decrypts the communication upon reception by receiver 144. Encryption/decryption unit 172 may be configured to utilized any standard encryption/decryption technology.

Video processing unit 164 is configured to process video that may be provided from camera 124. For instance, video processing unit 164 may be configured to digitally store video as a multimedia recording using storage unit 150, to be either displayed on user interface 104 or transmitted at some time in the future. Video processing unit 164 may also be configured to operate with transmitter 142 to transmit voice and video simultaneously upon selection of the transmit button 110 by a user.

Digital communication device 103 may be equipped with the capability to geographically locate itself, for example, through a Global Positioning System (GPS) capability. The Global Positioning System (GPS) is an example of a radio-based technology that is used to provide an earth based position using orbiting space satellites. GPS receiver 168 receives radio frequency signals from radio-based transmitters (e.g., GPS satellites or ground stations). These radio frequency signals are used to calculate the current location of the digital communication device 103. Compass 170 is configured to provide directional information to the digital communication device 103. For instance, compass 170 may be configured as a traditional compass to display the current heading relative to magnetic North that the digital communication device 103 is facing on user interface 104. Additionally, compass 170 may be used to compute a relative direction from the digital communication device 103 to another digital communication device (100a-100g).

Other units include a clock 166, a run-time engine 174, and a security unit 176. The clock 166 is configured to display the current time on user interface 104. Run-time engine 174 is configured to execute a computer program that is written in, but not limited to, Java, C#, Basic, Assembler, C and C++ programming languages. Additional computer programs may be downloaded to expand the capability of the digital communication device 103. For instance, a computer game program may be downloaded or preconfigured in the digital communication device 103. Security unit 176 is configured to provide additional security features to the digital communication device 103, such as password, voice and fingerprint authentication.

Additionally, storage unit 150 is configured to maintain a list of contact information in CONTACT_LIST 177. For instance, as is well known in the art, contact information may include a name, telephone number, fax number, and address. The contact information in CONTACT_LIST 177 may be displayed on user interface 104 or transmitted to another digital communication device (100a-100g).

As an example, FIGS. 1A and 1E show several digital communication devices, 100a, 100b, 100c and 100d, which are displayed on user interface 146 as a selectable collection of names, WARREN, MARK, EDWIN and CHUNG, respectively, on digital communication device 100. Each of the digital communication devices (100a, 100b, 100c and 100d) periodically transmit identifying information that is unique to the digital communication device as a digital control signal, such that digital communication device 100 can immediately determine which other digital communication devices (100*a*, 100*b*, 100*c* and 100*d*) are within a communication range 178 by receiving identifying information from each of the other digital communication devices (100*a*, 100*b*, 100*c* and 100*d*). Whether a digital communication device (100*a*, 100*b*, 100*c* and 100*d*) is no longer within the communication range 178 can also be determined by the absence of periodic identifying information received from that communication device (100*a*, 100*b*, 100*c* and 100*d*).

Referring to FIG. 1F, an example of several digital communication devices illustrating a communication path across multiple communication ranges according to an alternate embodiment of the present invention is shown. In this alternate embodiment, the effective communication range is extended by utilizing other digital communication devices as a digital communication relay or router. As an example, shown in FIG. 1F, digital communication device 100 has a communication range 180 that includes digital communication device 100*b*, but does not include digital communication device 100*c*. Digital communication device 100*b* is within communication ranges 180 and 182. Accordingly, a communication path 184 is established from digital communication device 100 to digital communication device 100*b*. Digital communication device 100*b* acts as a relay or hop to establish a communication path 186 to digital communication device 100*c*. Thus, a control signal and/or voice signal may be transmitted from digital communication device 100 to digital communication device 100*c* using communication paths 184 and 186. Thereby, the effective communication range is extended to the communication range of all digital communication devices (100*a* and 100*b*) within the communication range 178 of digital communication device 100. Any compatible device including fixed towers within the communication range 178 of digital communication device 100 may act as a relay.

Whether a digital communication device acts as a relay or utilizes a relay of another digital communication device to extend its effective communication range is configurable by the user. For instance, the relay capability or utilizing a relay may be disable or enabled by the user. Further, the relay capability may be limited to a subset of digital communication devices (100*a* and 100*b*), such as only those users represented in the BUDDY_LIST. Also, the number of hops may be limited by the user. For instance, a digital communication device may be configured to utilize only one relay or hop to extend the effective range.

Figure 1G:
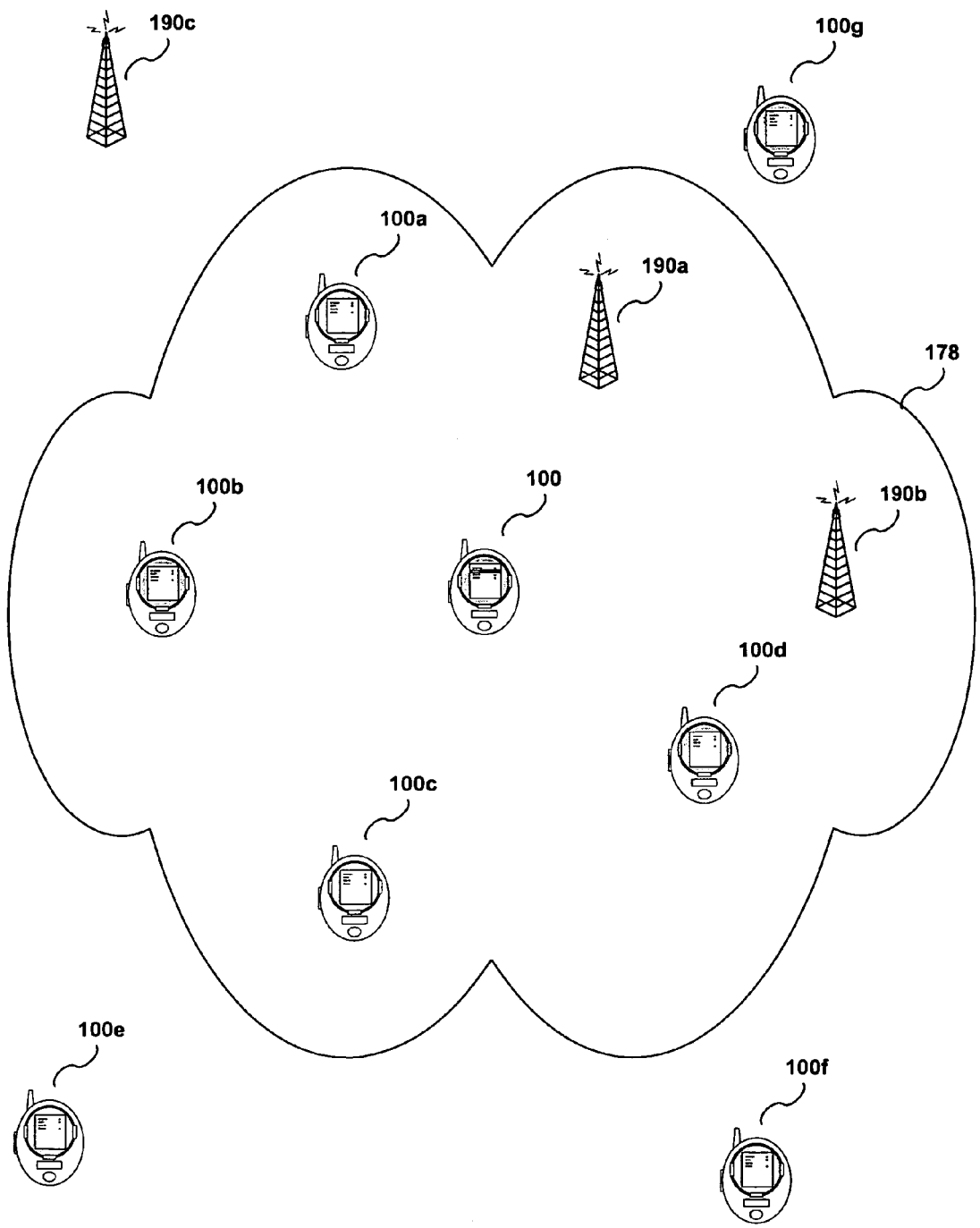
FIG. 1G is an example of several digital communication devices illustrating advertisers within a communication range according to an alternate embodiment of the present invention.

Referring to FIG. 1G, an example of several digital communication devices illustrating advertisers within a communication range according to an alternate embodiment of the present invention is shown. In this alternate embodiment, the receiver 144 is configured to receive advertisements from advertisers (190*a* and 190*b*) within a communication range 178. The advertisers (190*a*-190*c*) may operate on the same and/or an alternate digital radio frequency, and are configured to periodically transmit identifying information and/or advertisements as a control signal and/or voice signal. In this case, an advertisement transmitted by the advertisers (190*a* and 190*b*) within the communication range 178 will be periodically received by digital communication device 100. Computation unit 148 is further configured to control the receiver 144 to receive these advertisements, and to control the user interface unit 146 to display the advertisements received.

Figure 2A:
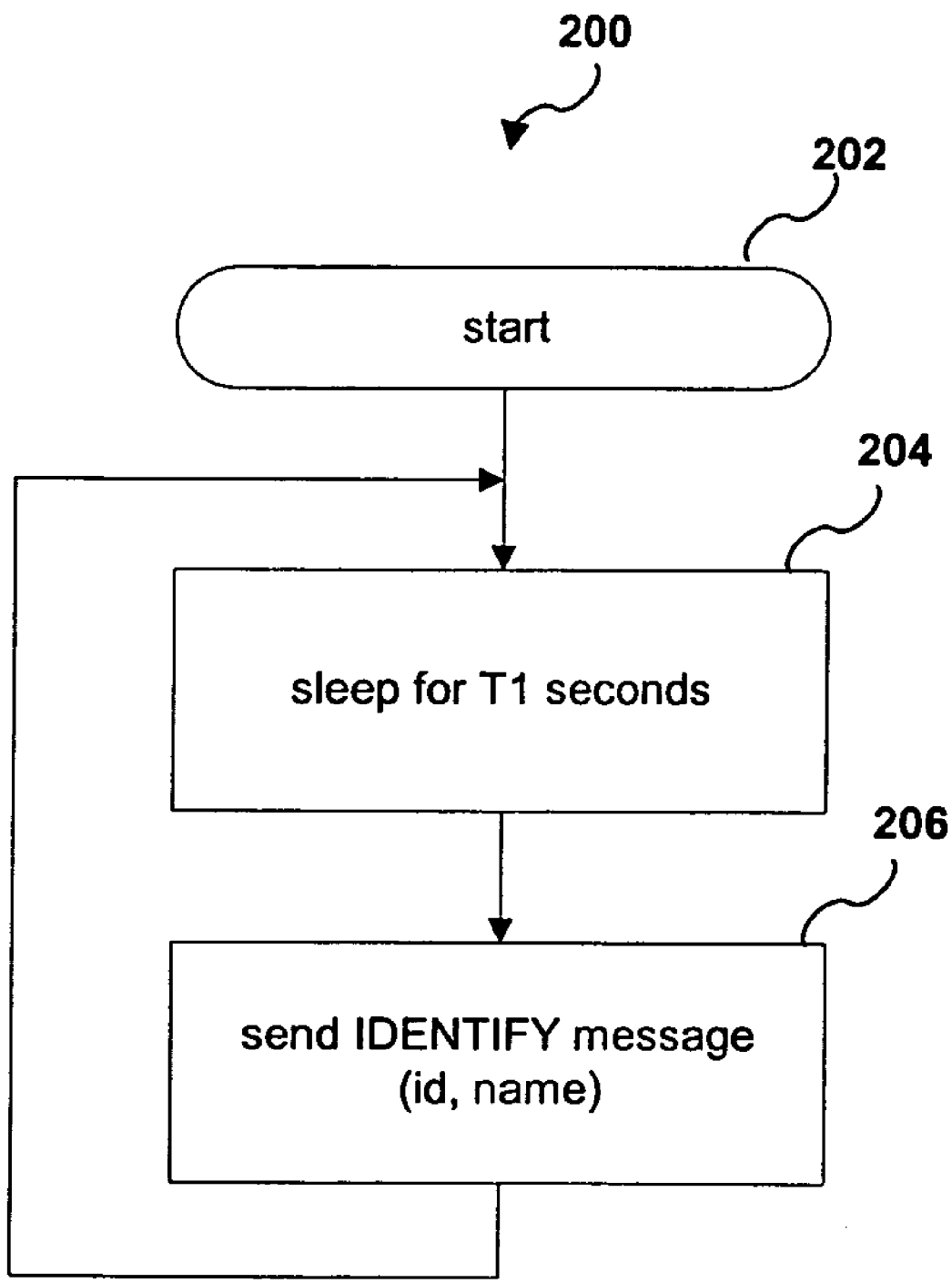
FIG. 2A is a flowchart illustrating the steps of sending an identification message to another digital communication device by broadcasting to all devices within a communication range according to an embodiment of the present invention.

Referring to FIG. 2A, a flowchart illustrating the steps of sending an identification message to another digital communication device within a communication range according to an embodiment of the present invention is shown. The computational unit 148 is configured to control transmitter 142 to periodically transmit an IDENTIFY message at Block 206. The IDENTIFY message contains at least an identifier uniquely identifying the digital communication device from which the IDENTIFY message was sent. The IDENTIFY message may also contain a name arbitrarily assigned by a user of the digital communication device as a configuration parameter 160. At Block 204, the computation unit sets an internal timer to send a message in T1 seconds. For instance, a default time T1 of 1 second between IDENTIFY messages may be built into the digital communication device during manufacture or assigned by the user and stored as a configuration parameter 160. The time T1 between IDENTIFY messages may be changed either dynamically or automatically based on the network load.

Figure 2B:
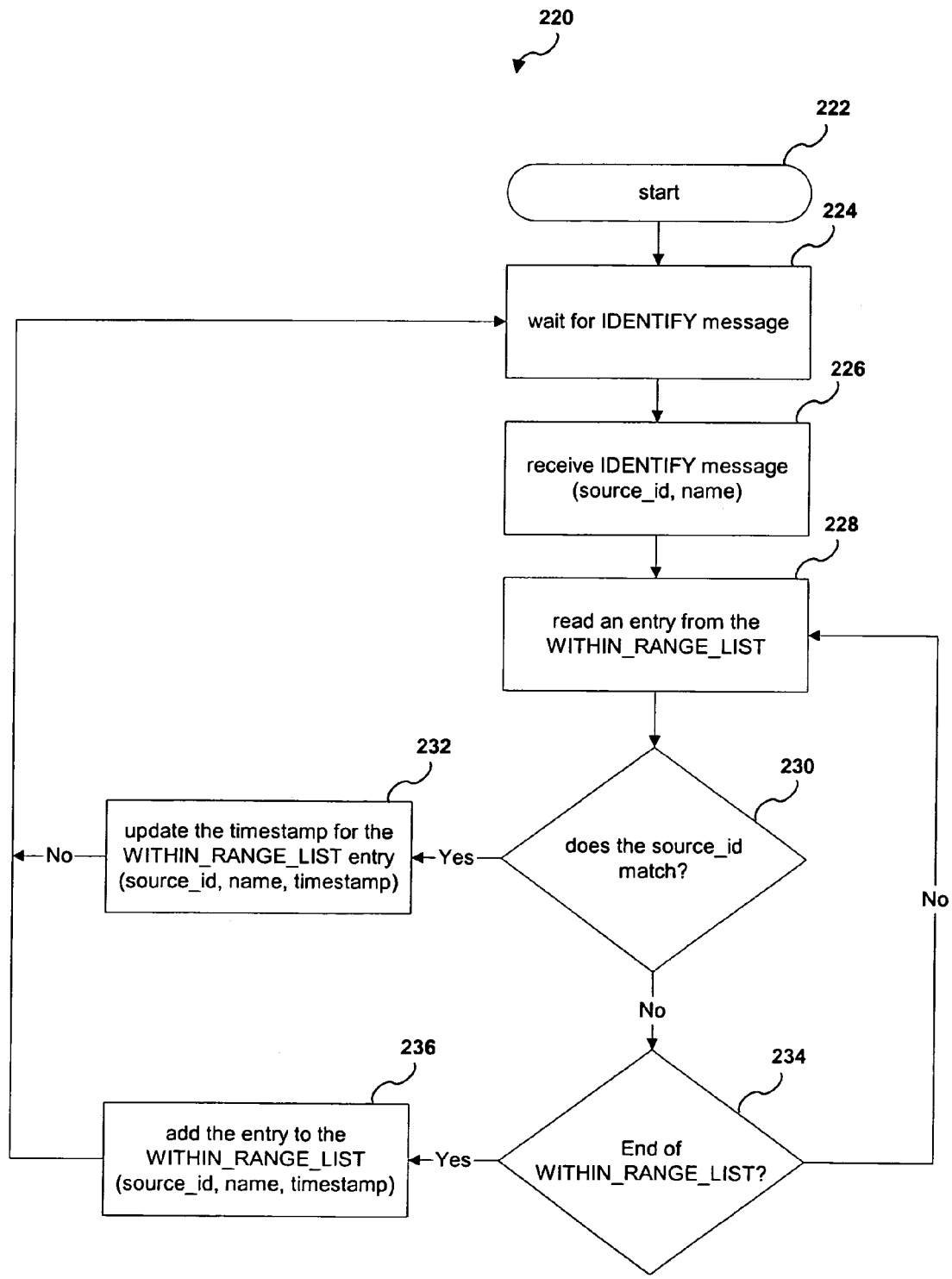
FIG. 2B is a flowchart illustrating the steps of identifying another digital communication device within a communication range according to an embodiment of the present invention.

Referring to FIG. 2B, a flowchart illustrating the steps of identifying another digital communication device within a communication range according to an embodiment of the present invention is shown. The computational unit 148 is configured to control receiver 144 to wait for an IDENTIFY message and subsequently receive the IDENTIFY message at Blocks 224 and 226. An IDENTIFY message includes at least a remote identifier (source_id) that uniquely identifies the transmitting digital communication device (100*a*-100*d*) from which the IDENTIFY message was sent. The IDENTIFY message may also include an arbitrary name assigned by the user of the transmitting digital communication device (100*a*-100*d*). WITHIN_RANGE_LIST 152 is read to determine if the transmitting digital communication device (100*a*-100*d*) has recently sent an IDENTIFY message (Blocks 228, 230 and 234), thereby indicating that the transmitting digital communication device (100*a*-100*d*) is within the communication range of the digital communication device 100. If the transmitting digital communication device (100*a*-100*d*) has not recently transmitted an IDENTIFY message, then at least a timestamp and a remote identifier (source_id) that uniquely identifies the transmitting digital communication device (100*a*-100*d*) are added to the WITHIN_RANGE_LIST 152 at Block 236. Otherwise, if the transmitting digital communication device (100*a*-100*d*) has recently transmitted an IDENTIFY message, then at least the timestamp is updated at Block 232. The user may optionally be notified that an entry is added to the WITHIN_RANGE_LIST 152 at Block 236 by means of an audible signal, a visual indication, or a vibration. For instance, the current number of entries contained within the WITHIN_RANGE_LIST 152 may be visually indicated on user interface 104.

Figure 2C:
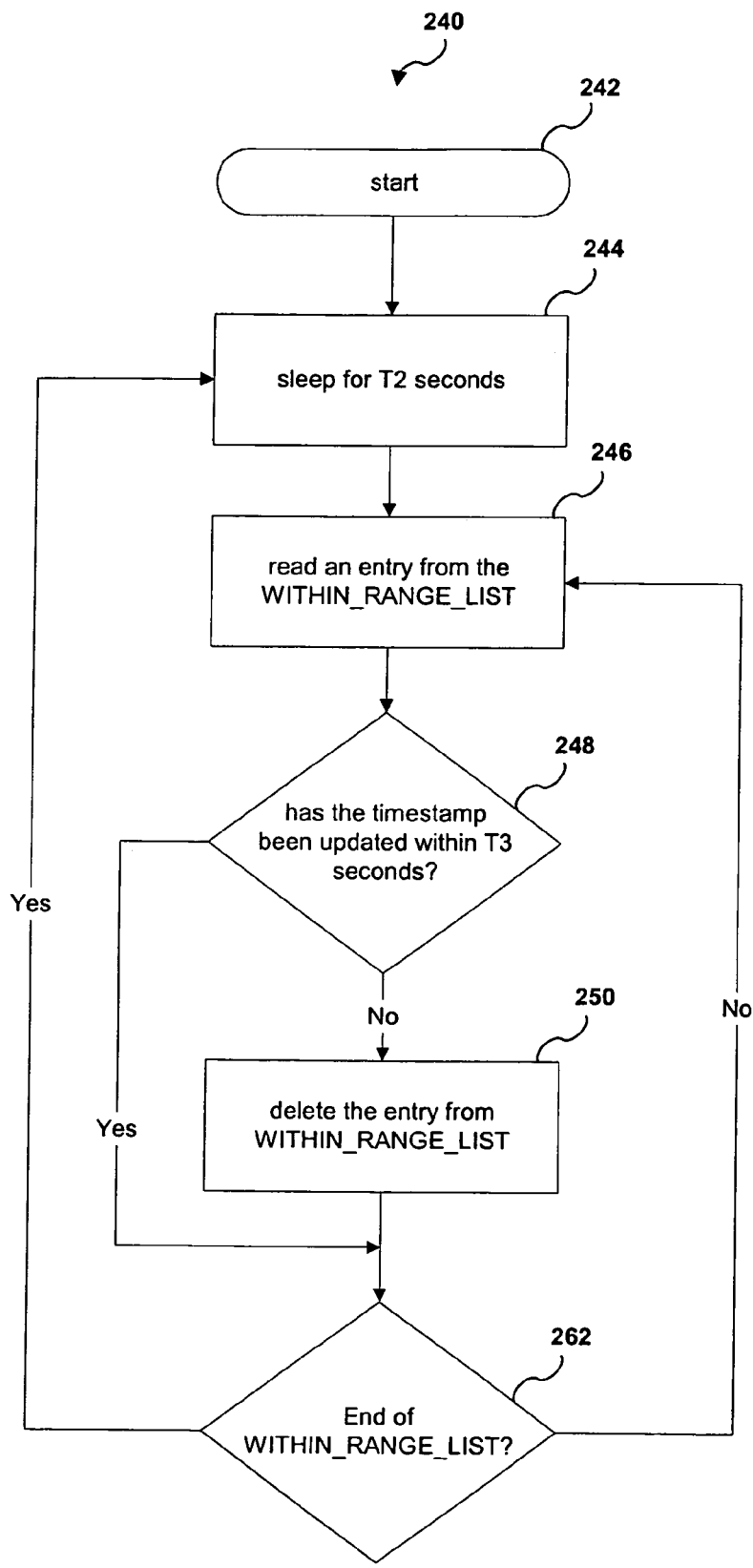
FIG. 2C is a flowchart illustrating the steps of removing the identification information of a digital communication device no longer within a communication range according to an embodiment of the present invention.

Referring to FIG. 2C, a flowchart illustrating the steps of removing the identification information of a digital communication device no longer within a communication range according to an embodiment of the present invention is shown. The computational unit 148 is configured to periodically read the WITHIN_RANGE_LIST 152 to determine if any of the entries have not been updated by an IDENTIFY message recently, shown as steps 240. At Block 244, the computation unit sets an internal timer to continue in T2 seconds. For instance, a default time T2 of 30 seconds may be built into the digital communication device during manufacture or assigned by the user and stored as a configuration parameter 160. At Block 246, an entry from the WITHIN_RANGE_LIST 152 is read. At Logic Block 248, it is determined if the timestamp for this entry has been updated within T3 seconds. For instance, a default time T3 of 60 seconds may be built into the digital communication device during manufacture or assigned by the user and stored as a configuration parameter 160. If the timestamp has not been updated within T3 seconds, then the entry is deleted from the WITHIN_RANGE_LIST 152 at Block 250. The user may optionally be notified that an entry is deleted from the WITHIN_RANGE_LIST 152 at Block 250 by means of an audible signal, a visual indication, or a vibration. Processing continues and the next entry in the WITHIN_RANGE_LIST is read until the entire WITHIN_RANGE_LIST has been read (Blocks 246, 248, 250 and 262). It is to be understood that other sleep times T1-T3 are possible without departing from the scope of the present invention.

Figure 3A:
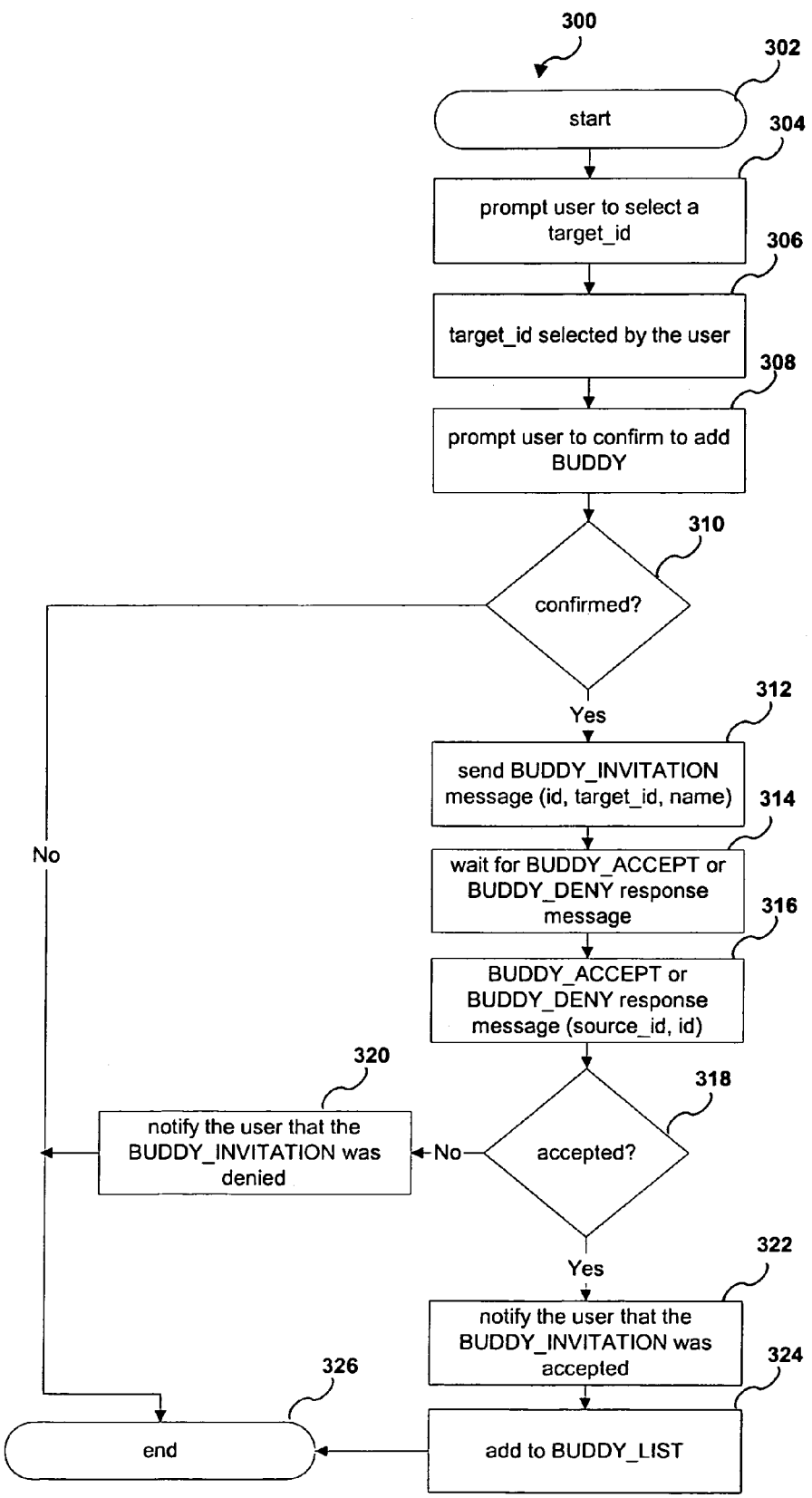
FIG. 3A is a flowchart illustrating the steps of sending a buddy invitation message to another digital communication device within a communication range according to an embodiment of the present invention.

Referring to FIG. 3A, a flowchart illustrating the steps of sending a buddy invitation message to another digital communication device within a communication range according to an embodiment of the present invention is shown. At Blocks 304 and 306, the appropriate digital communication device to be added as a buddy is selected. At Block 308, the user is optionally prompted to confirm that the correct digital communication device to be added as a buddy has been selected. At Logic Block 310, the user confirmation is determined. If the user did not confirm the selection, then processing is ended as shown at Block 326. Otherwise, computational unit 148 is configured to control transmitter 142 to transmit a BUDDY_INVITATION message at Block 312. A BUDDY_INVITATION message includes at least the unique identifier (id) of digital communication device 100 and a remote identifier (target_id) that uniquely identifies the digital communication device (100*a*-100*d*) to be added as a buddy. The computational unit 148 is configured to control receiver 144 to wait for a response message and subsequently receive either a BUDDY_ACCEPT or BUDDY_DENY message as a response at Blocks 314 and 316. At Logic Block 318, it is determined whether a BUDDY_ACCEPT or BUDDY_DENY message was received. If a BUDDY_DENY message was received, then the user is notified of the denial at Block 320. Otherwise, if a BUDDY_ACCEPT message was received, then the user is notified of the acceptance at Block 322 and the remote identifier (target_id) is added to the BUDDY_LIST 156 of digital communication device 100. It is to be understood that the BUDDY_ACCEPT and BUDDY_DENY messages may be a single response message indicating an acceptance or denial without departing from the scope of the present invention. Optionally, the current number of corresponding entries contained in the WITHIN_RANGE_LIST and the BUDDY_LIST may be visually indicated on user interface 104.

Figure 3B:
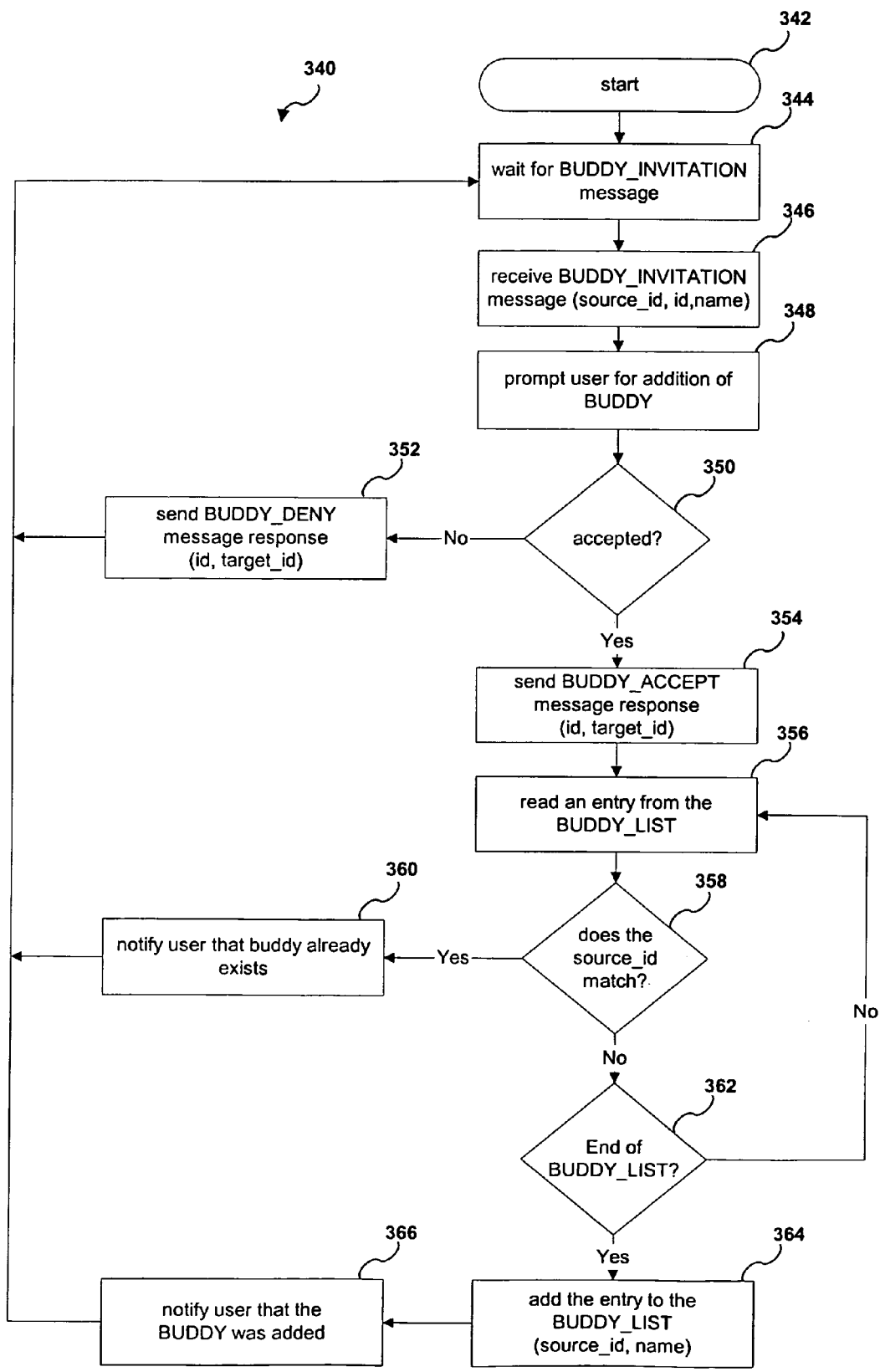
FIG. 3B is a flowchart illustrating the steps of processing buddy information sent from another digital communication device within a communication range according to an embodiment of the present invention.

Referring to FIG. 3B, a flowchart illustrating the steps of processing buddy information sent from another digital communication device within a communication range according to an embodiment of the present invention is shown. The computational unit 148 is configured to control receiver 144 to wait for a BUDDY_INVITATION message and subsequently receive the BUDDY_INVITATION message at Blocks 344 and 346. At Block 348, the user is prompted to choose whether to accept or deny the buddy invitation. At Logic Block 350, the user selection to accept or deny the buddy invitation is determined. If the user chooses to deny the buddy invitation, then computational unit 148 is configured to control transmitter 142 to transmit a BUDDY_DENY message at Block 352. Otherwise, computational unit 148 is configured to control transmitter 142 to transmit a BUDDY_ACCEPT message at Block 354. Processing then resumes at Block 344.

Figure 3C:
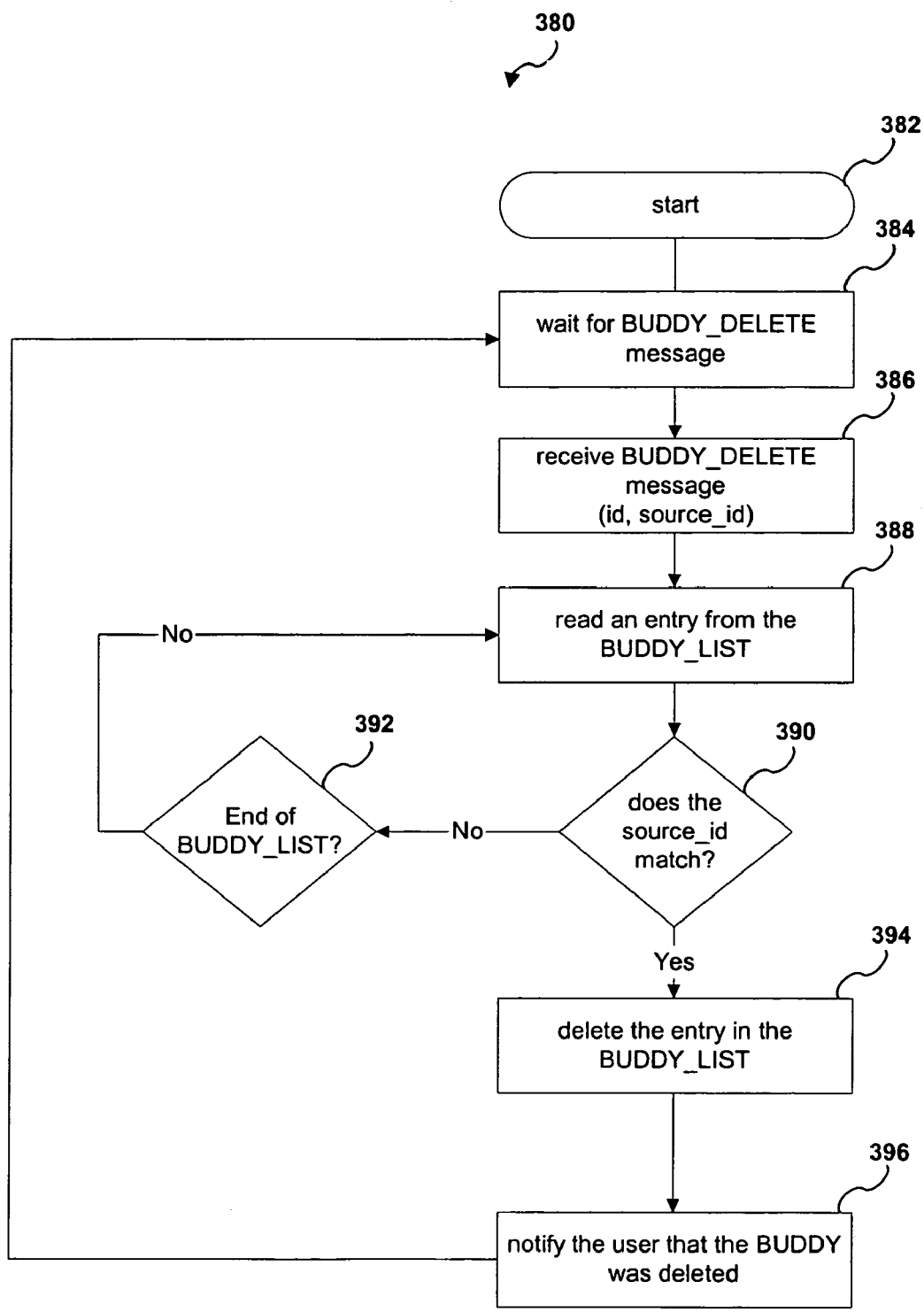
FIG. 3C is a flowchart illustrating the steps of deleting buddy information according to an embodiment of the present invention.

Referring to FIG. 3C, a flowchart illustrating the steps of deleting buddy information according to an embodiment of the present invention is shown. The computational unit 148 is configured to control receiver 144 to wait for a BUDDY_DELETE message and subsequently receive the BUDDY_DELETE message at Blocks 384 and 386. At Block 388, an entry from the BUDDY_LIST 156 is read. Note that a BUDDY_DELETE message is transmitted by another digital communication device upon request by a user. At Logic Block 390, it is determined if the entry matches the digital communication device to be deleted as a buddy. If the entry does not match, then processing continues and the next entry in the BUDDY_LIST 156 is read until the entire BUDDY_LIST 156 has been read (Blocks 388, 390 and 392). Otherwise, if the entry does match, then the entry is deleted from the BUDDY_LIST at Block 394. Next, the user is notified of the deletion at Block 396. Processing then resumes at Block 384.

Figure 4A:
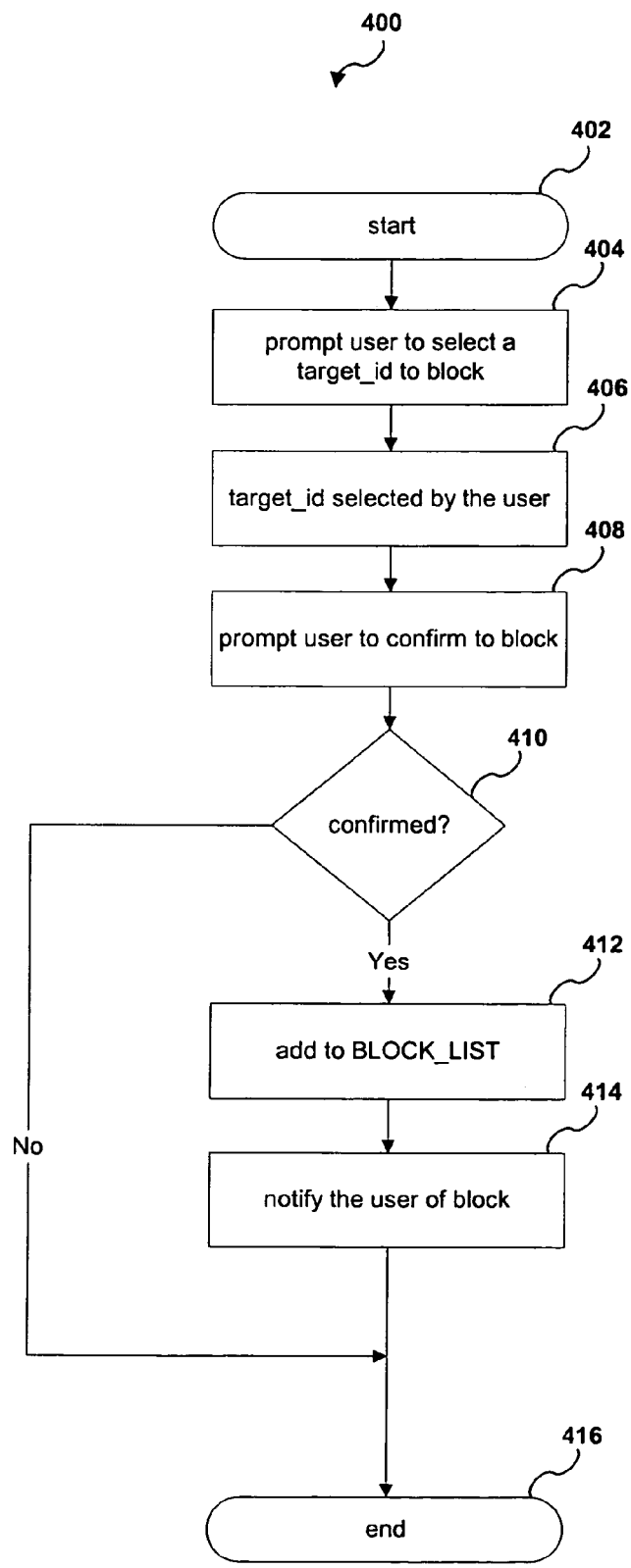
FIG. 4A is a flowchart illustrating the steps of blocking a digital communication device according to an embodiment of the present invention.

Referring to FIG. 4A, a flowchart illustrating the steps of blocking a digital communication device according to an embodiment of the present invention is shown. At Blocks 404 and 406, the appropriate digital communication device to be blocked is selected. At Block 408, the user is optionally prompted to confirm that the correct digital communication device to be blocked has been selected. At Logic Block 410 the user confirmation is determined. If the user did not confirm the selection, then processing is ended as shown at Block 416. Otherwise, the selected digital communication device to be blocked is added to the BLOCK_LIST 154. Finally, the user is not notified of the block at Block 414.

Figure 4B:
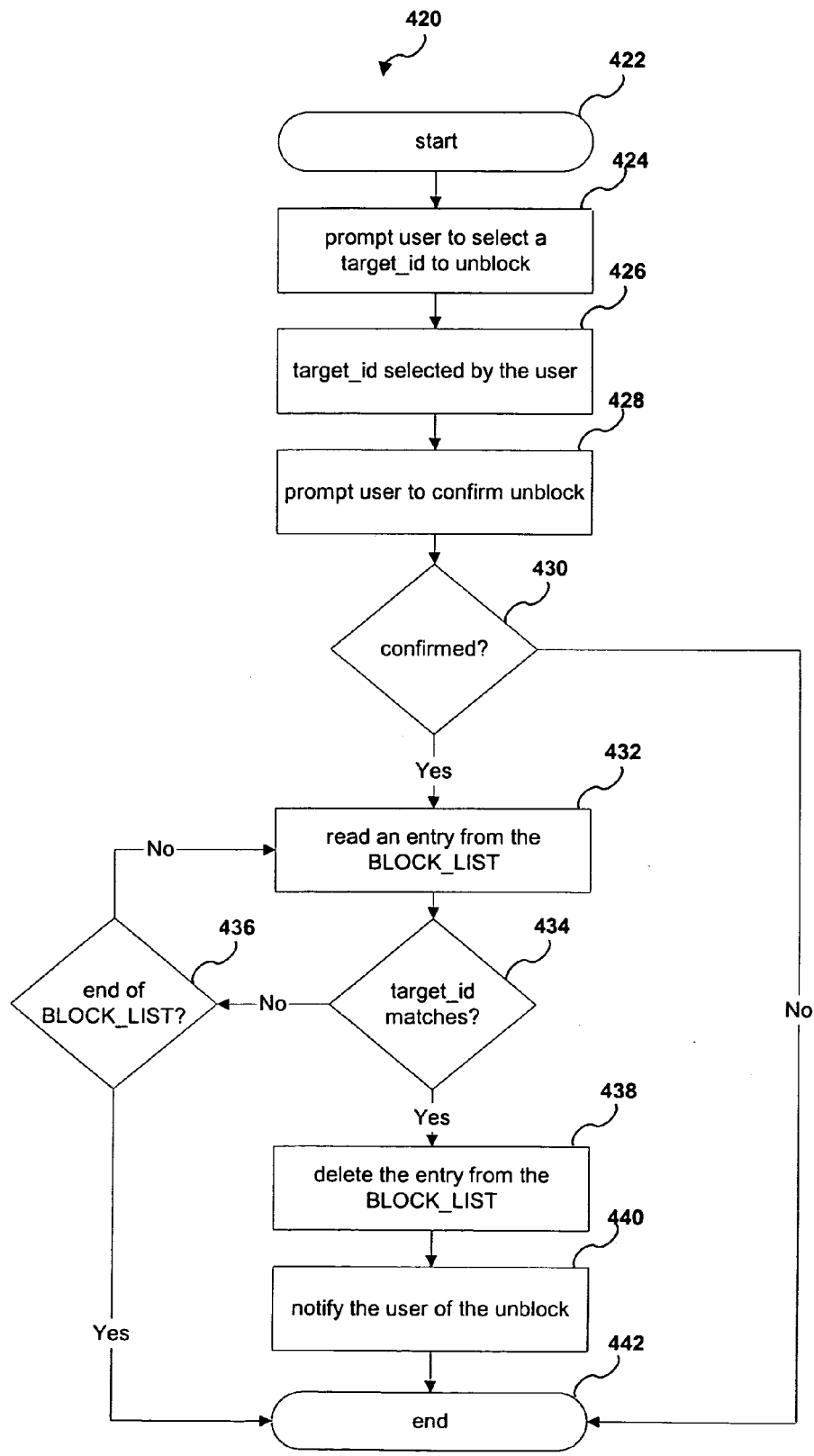
FIG. 4B is a flowchart illustrating the steps of unblocking a digital communication device according to an embodiment of the present invention.

Referring to FIG. 4B, a flowchart illustrating the steps of unblocking a digital communication device according to an embodiment of the present invention is shown. At Blocks 424 and 426, the appropriate digital communication device to be unblocked is selected. At Block 428, the user is optionally prompted to confirm that the correct digital communication device to be unblocked has been selected. At Logic Block 430, the user confirmation is determined. If the user did not confirm the selection, then processing is ended as shown at Block 442. Otherwise, at Block 432, an entry from the BLOCK_LIST 154 is read. At Logic Block 434, it is determined if this entry matches the digital communication device (100*a*-100*g*) to be unblocked. If the entry does not match, then processing continues and the next entry in the BLOCK_LIST 154 is read until the entire BUDDY_LIST 154 has been read (Blocks 432, 434 and 436). Otherwise, if the entry does match, then the entry is deleted from the BLOCK_LIST at Block 438. Next, the user is notified of the deletion at Block 440.

Figure 5A:
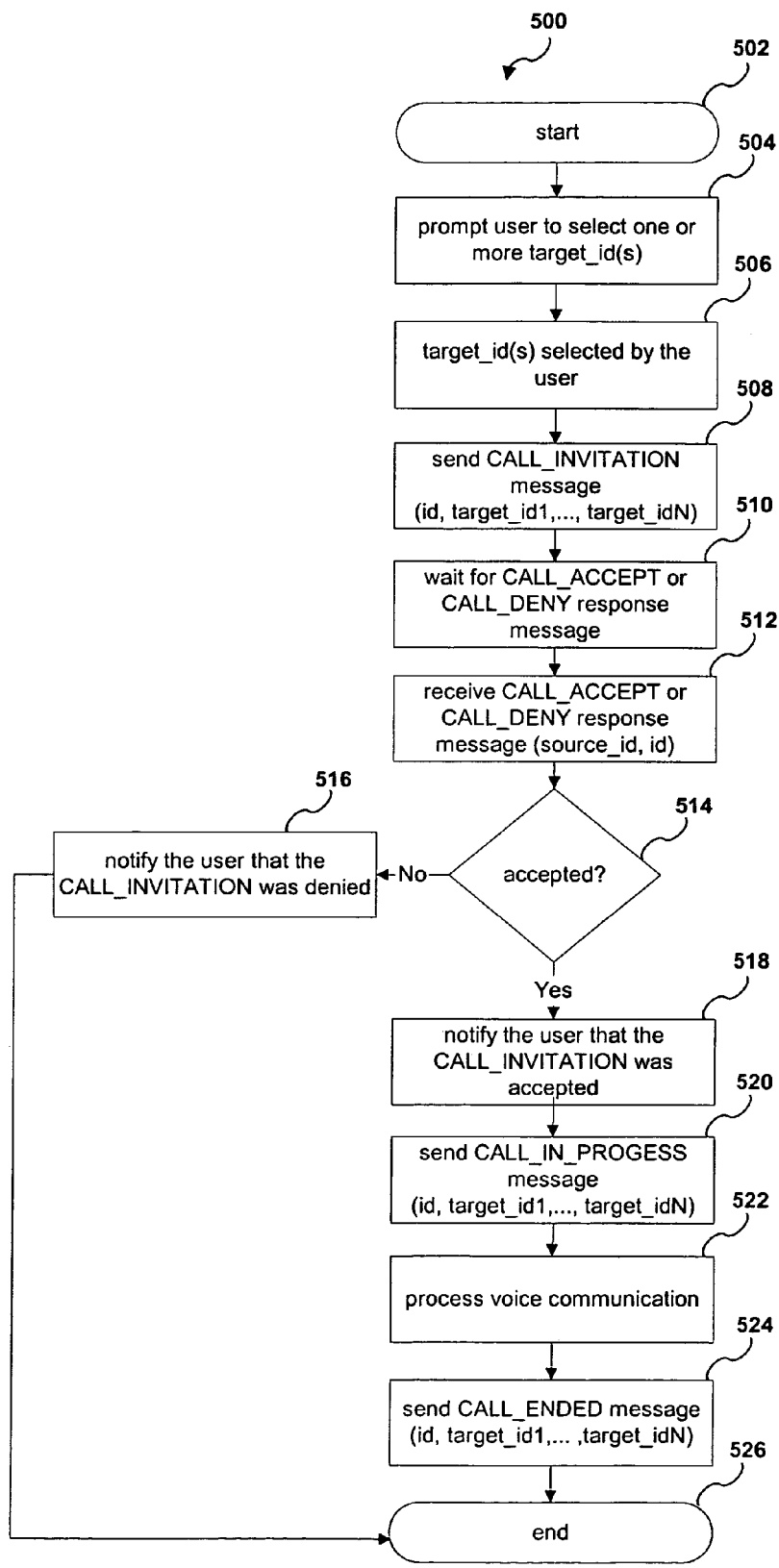
FIG. 5A is a flowchart illustrating the steps of sending a call invitation to another digital communication device within a communication range according to an embodiment of the present invention.

Referring to FIG. 5A, a flowchart illustrating the steps of sending a call invitation to another digital communication device within a communication range according to an embodiment of the present invention is shown. At Blocks 504 and 506, the appropriate digital communication device to call is selected by the user. Computational unit 148 is configured to control transmitter 142 to transmit a CALL_INVITATION message at Block 508. A CALL_INVITATION message includes at least the unique identifier (id) of digital communication device 100 and one or more remote identifiers (target_id1, . . . ,target_idN) that uniquely identify the digital communication device or devices (100*a*-100*d*) to call. The computational unit 148 is configured to control receiver 144 to wait for a response message and subsequently receive either a CALL_ACCEPT or CALL_DENY message as a response at Blocks 510 and 512. At Logic Block 514, it is determined whether a CALL_ACCEPT or CALL_DENY message was received. If a CALL_DENY message was received, then the user is notified of the denial at Block 516. Otherwise, if a CALL_ACCEPT message was received, then the user is notified of the acceptance at Block 518. Computational unit 148 may optionally be configured to control transmitter 142 to transmit a CALL_IN_PROGRESS message at Block 520. The CALL_IN_PROGRESS message is received by other digital communication devices (100a-100d) within the communication range 178 and may be used to display calls in progress on their respective user interface units 146. At Block 522, the voice communication is processed between the source and target digital communication devices. The voice communication may be terminated by a user volitionally or by communication inactivity. Next, computational unit 148 may optionally be configured to control transmitter 142 to transmit a CALL_ENDED message at Block 524. It is to be understood that the CALL_ACCEPT and CALL_DENY messages may be a single response message indicating an acceptance or denial without departing from the scope of the present invention.

Figure 5B:
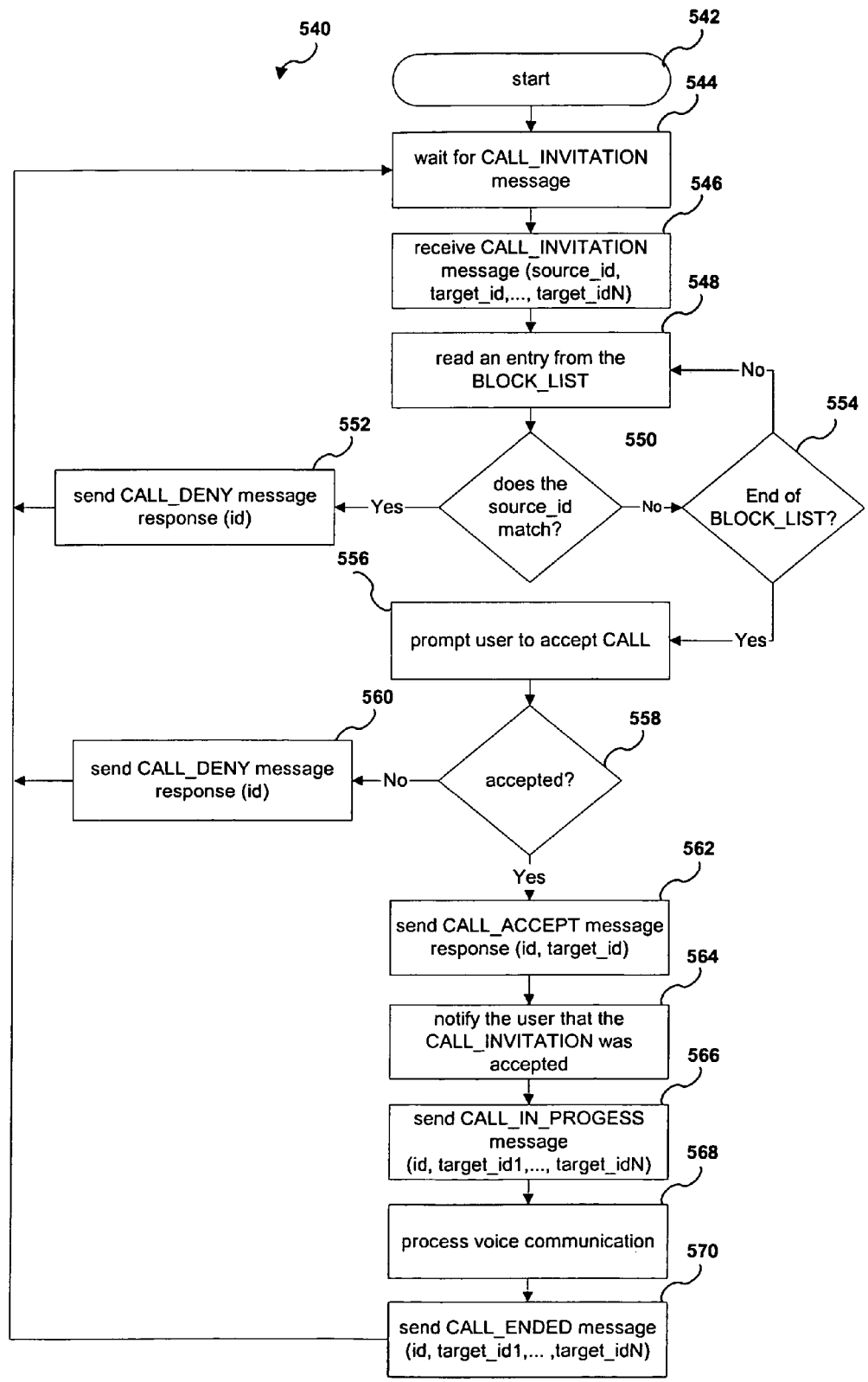
FIG. 5B is a flowchart illustrating the steps of processing a call invitation sent from another digital communication device within a communication range according to an embodiment of the present invention.

Referring to FIG. 5B, a flowchart illustrating the steps of processing a call invitation sent from another digital communication device within a communication range according to an embodiment of the present invention is shown. The computational unit 148 is configured to control receiver 144 to wait for a CALL_INVITATION message and subsequently receive the CALL_INVITATION message at Blocks 544 and 546. At Block 548, an entry from the BLOCK_LIST 154 is read. At Logic Block 550, it is determined if this entry matches the digital communication device (100a-100d) requesting a call invitation. If the entry does not match, then processing continues and the next entry in the BLOCK_LIST 154 is read until the entire BLOCK_LIST 154 has been read (Blocks 548, 550 and 554). If the entry does match, then computational unit 148 is configured to control transmitter 142 to transmit a CALL_DENY message at Block 552. Otherwise, if an entry matching the digital communication device (100a-100d) requesting a call invitation is not found in the BLOCK_LIST 154, then at Block 556, the user is optionally prompted to accept the call invitation. At Logic Block 558, the user acceptance is determined. If the user did not accept the call invitation, then computational unit 148 is configured to control transmitter 142 to transmit a CALL_DENY message at Block 560. Otherwise, computational unit 148 is configured to control transmitter 142 to transmit a CALL_ACCEPT message at Block 562. A CALL_ACCEPT message includes at least the unique identifier (id) of digital communication device 100 and a remote identifier (target_id) that uniquely identifies the digital communication device (100a-100d) requesting a call invitation. At Block 564, the user is optionally notified that the call was accepted. This notification may be by any number of means including an audio tone or a graphical pop-up. Computational unit 148 may optionally be configured to control transmitter 142 to transmit a CALL_IN_PROGRESS message at Block 566. At Block 568, the voice communication is processed between the source and target digital communication devices. Again, the voice communication may be terminated by a user volitionally or by communication inactivity. Next, computational unit 148 may optionally be configured to control transmitter 142 to transmit a CALL_ENDED message at Block 570.

Although the BUDDY_INVITATION, BUDDY_ACCEPT, BUDDY_DENY, CALL_INVITATION, CALL_ACCEPT and CALL_DENY messages are received by all of the digital communication devices (100-100d) within a communication range 178, they are ignored by the digital communication devices (100-100d) that do not match the target identifier contained within these messages. Thus, even though these messages are broadcast, they appear to be targeted to a particular digital communication device or devices. Additionally, computational unit 148 may optionally be configured to encrypt all digital radio communication before transmission and to decrypt the digital radio communication after reception by the target digital communication device (100-100d). Further, although the interface is described in terms of the buttons, the operations described can be done using a voice command of the user speaking into microphone 106.

The processes and mechanisms set forth in the present description may be implemented using a conventional general purpose microprocessor programmed according to the teachings in the present specifications, as will be appreciated to those skilled in the relevant art. Appropriate software can be prepared based upon the teachings of the present disclosure, as will also be apparent to those skilled in the relevant arts.

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

The invention claimed is:

1. A digital communication device for identifying and communicating with other digital communication devices within a communication range, comprising:

a transmitter configured to transmit a first control signal and a first voice signal directly to other digital communication devices without utilizing fixed towers to re-transmit the first control signal and the first voice signal;

a receiver configured to receive a second control signal and a second voice signal directly from at least one of the other digital communication devices without utilizing fixed towers to re-transmit the second control signal and the second voice signal;

a computational unit configured to control the transmitter to periodically transmit identifying information as the first control signal, the first control signal being received as remote identifying information by the other digital communication devices within the communication range;

a user interface having a display area for displaying information corresponding to at least a portion of the second control signal received from the other digital communication devices, wherein the information is displayed on the display area as a list selectable by a user to create a selected set of digital communication devices;

a speaker configured to output the second voice signal received by the receiver; and a microphone configured to receive a voice communication from the user, wherein the user interface includes a transmit button, and the computational unit is configured to control the transmitter and the microphone to transmit the voice communication as the first voice signal while the transmit button is selected by the user to the selected set of digital communication devices, wherein the first voice signal is received by the other digital communication devices within the communication range, and wherein the voice communication is output exclusively on the speaker of the selected set of digital communication devices within the communication range.

2. The digital communication device according to claim 1, further comprising:

a storage unit configured to store the voice communication, wherein the user interface includes a record button, and the computational unit is configured to control the microphone and the storage unit to capture the voice communication using the microphone and to record the captured voice communication to the storage unit upon selection of the record button by the user.

3. The digital communication device according to claim 2, wherein the user interface includes a play button, and the computational unit is configured to control the speaker and the storage unit to output the recorded voice communication on the speaker upon selection of the play button by the user.

4. The digital communication device according to claim 1, wherein the list is a graphical list.

5. The digital communication device according to claim 4, wherein the communication range comprises a local communication range corresponding to the digital communication device and an extended communication range corresponding to all digital communication devices, at least one of the first control signal and the first voice signal is transmitted from the digital communication device to a second digital communication device within the local communication range, and the at least one of the first control signal and the first voice signal is transmitted from the second digital communication device to a third digital communication device outside the local communication range and within the extended communication range.

6. The digital communication device according to claim 5, wherein the second digital communication device is a fixed tower digital communication device.

7. The digital communication device according to claim 4, wherein the remote identifying information is sortable into groups by the user.

8. The digital communication device according to claim 7, wherein the groups comprise at least one of a buddy list, a within-range list, a blocked list, and a group list.

9. The digital communication device according to claim 1, wherein the voice communication comprises an encrypted voice communication.

10. The digital communication device according to claim 1, wherein the user interface includes a free-for-all mode button, the computational unit is configured to control the transmitter to transmit voice communication as the voice signal to the other digital communication devices upon selection of the free-for-all mode and transmit buttons by the user, the voice signal is received by the other digital communication devices within the communication range, and the voice communication is output on the speaker of the other digital communication devices within the communication range.

11. The digital communication device according to claim 1, wherein the user interface includes an emergency mode button, the computational unit is configured to control the transmitter to transmit voice communication as a voice signal to the other digital communication devices upon selection of the emergency mode and transmit buttons by the user, the voice signal is received by the other digital communication devices within the communication range, and the voice communication is output on the speaker of the other digital communication devices within the communication range.

12. The digital communication device according to claim 1, wherein the user interface includes a distress call button, the computational unit is configured to control the transmitter to transmit a distress call signal to the other digital communication devices upon selection of the distress call button by the user, the distress call signal is received by the other digital communication devices within the communication range, and the distress call signal is represented on the other digital communication devices within the communication range by at least one of an audible signal output on the speaker, a visual indication displayed on the display area, and a vibration.

13. The digital communication device according to claim 1, further comprising:

a storage unit configured to store one or more remote identifying information, wherein the user interface includes a store button, and the computational unit is configured to control the storage unit to store the one or more remote identifying information upon selection of the store button by a user.

14. The digital communication device according to claim 1, wherein the user interface includes a block button, and the computational unit is configured to block the voice communication upon selection of the block button by the user.

15. The digital communication device according to claim 14, wherein the list is a graphical list, and wherein the computational unit is configured to block the voice communication from the other digital communication devices within the communication range that correspond to one or more digital communication devices selected from the list.

16. The digital communication device according to claim 1, wherein at least one of the first control signal and the first voice signal is encrypted during transmission.

17. The digital communication device according to claim 1, further comprising:

a storage unit configured to store one or more configuration parameters, wherein the display area includes a configuration interface configured to receive one or more configuration parameters modified by a user.

18. The digital communication device according to claim 17, wherein the one or more configuration parameters comprise at least one of date and time, announcement options, volume control, advertisement options, upload and download options, blocking options, group options, and storage options.

19. The digital communication device according to claim 1, wherein the transmitter is configured to transmit a non-verbal text signal and the receiver is configured to receive the non-verbal text signal, the computational unit is configured to control the transmitter to transmit text communication as the non-verbal text signal to the other digital communication devices, the non-verbal text signal is received by the other digital communication devices within the communication range, and the text communication is displayed on the display area of each of the other digital communication devices receiving the non-verbal text signal.

20. The digital communication device according to claim 1, wherein the receiver is configured to receive one or more advertisements from a plurality of advertisers, and wherein the one or more advertisements are displayed on the display area of each of the other digital communication devices receiving the one or more advertisements.

21. The digital communication device according to claim 1, wherein the identifying information includes status information corresponding to a current status of the digital communication device.

22. The digital communication device according to claim 1, wherein the identifying information includes status information corresponding to a current status of the digital communication device.

23. The digital communication device according to claim 22, wherein the status information comprises at least one of a busy status, a sleep status, a do not disturb status, and a hardware failure status.

24. The digital communication device according to claim 1, wherein the computational unit is further configured to control the transmitter to transmit status information corresponding to a current status of the digital communication device as the first control signal to the other digital communication devices, the first control signal is received as remote status information by the other digital communication devices within the communication range, and the status information is displayed on the display area of each of the other digital communication devices receiving the first control signal.

25. The digital communication device according to claim 24, wherein the status information comprises at least one of a busy status, a sleep status, a do not disturb status, and a hardware failure status.

26. The digital communication device according to claim 1, wherein the transmitter is configured to transmit the first control signal and the first voice signal separately.

27. The digital communication device according to claim 1, wherein the first control signal and the first voice signal are encrypted.

28. The digital communication device according to claim 1, wherein at least one of an audible signal output on the speaker, a visual indication displayed on the display area, and a vibration occurs when the remote identifying information is initially displayed on the display area of each of the other digital communication devices receiving the first control signal.

29. The digital communication device according to claim 1, further comprising a system unit configured to determine a current location using radio signals.

30. The digital communication device according to claim 29, wherein the radio signals comprise Global Positional System (GPS) orbiting space satellite signals.

31. The digital communication device according to claim 30, wherein the current location is displayed on the display area of the user interface.

32. The digital communication device according to claim 30, wherein the identifying information includes the current location.

33. The digital communication device according to claim 32, wherein a relative direction is displayed on the display area of the user interface and corresponds to the current location of each of the other digital communication devices within the communication range.

34. The digital communication device according to claim 1, wherein the first control signal and the first voice signal are transmitted and received using at least one of a digital spread spectrum frequency protocol, a Blue tooth protocol, Wi-Fi protocol, Code Division Multiple Access (CDMA) protocol, Time Division Multiple Access (TDMA) protocol, Frequency Division Multiple Access (FDMA) protocol, and Global System for Mobile communication (GSM) protocol.

35. The digital communication device according to claim 1, wherein the digital spread spectrum frequency protocol comprises a 900 MHz digital radio spectrum frequency protocol.

36. The digital communication device according to claim 1, wherein a time period between periodic transmissions of the control signal is configurable.

37. The digital communication device according to claim 36, wherein the time period is manually configurable.

38. The digital communication device according to claim 36, wherein the time period is automatically configured to correspond to a network load.

39. The digital communication device according to claim 1, further comprising:
a digital camera; and
a video processing unit configured to receive video from the digital camera,
wherein the transmitter is configured to transmit a video signal, the receiver is configured to receive the video signal, the computational unit is configured to control the video processing unit and the transmitter to transmit the video from the digital camera as the video signal, the video is received by the other digital communication devices within the communication range and displayed on the display area of the other digital communication devices receiving the video signal.

40. The digital communication device according to claim 1, further comprising a multi-purpose interface comprising at least one of a computer interface and a keyboard interface.

41. The digital communication device according to claim 40, further comprising:
a storage unit configured to store one or more configuration parameters,
wherein the computer interface connects a computer having a configuration interface configured to receive the one or more configuration parameters modified by the user.

42. The digital communication device according to claim 1, further comprising a removable memory interface configured to receive a removable memory device.

43. A method for identifying and communicating with digital communication devices within a communication range, comprising:
transmitting identifying information as a first control signal periodically directly to other digital communication devices without utilizing fixed towers to re-transmit the control signal;
receiving at least one second control signal as remote identifying information corresponding to the digital communication devices within the communication range directly from other digital communication devices without utilizing fixed towers to re-transmit the control signal and a voice signal;
displaying, on a display area, information corresponding to at least a portion of the remote identifying information received from the digital communication devices within the communication range, wherein the information corresponding to the remote identifying information is displayed as a list selectable by a user to create a selected set of digital communication devices;
capturing a voice communication via a microphone; and
transmitting the voice communication as a voice signal while a transmit button is selected by the user to the selected set of digital communication devices;
wherein the voice signal is received by the selected set of digital communication devices and the voice communication on is output exclusively on the speaker of the selected set of digital communication devices.

44. The method according to claim 43, wherein the list is a graphical list.

45. A computer program product in a computer readable medium for controlling a digital communication device to identify and communicate with other digital communication devices within a communication range, the computer program product comprising:

first executable computer code for transmitting identifying information as a control signal periodically directly to other digital communication devices without utilizing fixed towers to re-transmit the control signal;

second executable computer code for receiving the control signal as remote identifying information corresponding to the digital communication devices within the communication range directly from other digital communication devices without utilizing fixed towers to re-transmit the control signal and a voice signal;

third executable computer code for displaying information corresponding to at least a portion of the remote identifying information on a display area corresponding to the digital communication devices receiving the control signal, wherein the information is displayed on the display area as a list selectable by a user to create a selected set of digital communication devices; and fourth executable computer code for capturing a voice communication via a microphone and transmitting the voice communication as a voice signal while a transmit button is selected by a user to the selected set of digital communication devices;

wherein the voice signal is received by the selected set of digital communication devices and the voice communication is output exclusively on a speaker of the selected set of digital communication devices upon reception.

46. The computer program according to claim 45, wherein the list is a graphical list.

* * * * *